(12) United States Patent
Marimuthu

(10) Patent No.: US 7,979,845 B2
(45) Date of Patent: Jul. 12, 2011

(54) TEST EFFORT OPTIMIZATION FOR UI INTENSIVE WORKFLOWS

(75) Inventor: Vankadesan Marimuthu, Chennai (IN)

(73) Assignee: Cisco Technology, Inc., San Jose, CA (US)

(*) Notice: Subject to any disclaimer, the term of this patent is extended or adjusted under 35 U.S.C. 154(b) by 1302 days.

(21) Appl. No.: 11/138,805

(22) Filed: May 26, 2005

(65) Prior Publication Data

US 2006/0224921 A1 Oct. 5, 2006

(51) Int. Cl.
*G06F 9/44* (2006.01)
(52) U.S. Cl. ............ 717/124; 717/125; 714/38
(58) Field of Classification Search ........... 717/124–135
See application file for complete search history.

(56) References Cited

U.S. PATENT DOCUMENTS

| | | | | |
|---|---|---|---|---|
| 5,600,789 A | * | 2/1997 | Parker et al. | 714/38 |
| 5,781,720 A | * | 7/1998 | Parker et al. | 714/38 |
| 6,067,639 A | * | 5/2000 | Rodrigues et al. | 714/38 |
| 7,114,111 B2 | * | 9/2006 | Noy | 714/738 |
| 7,685,576 B2 | * | 3/2010 | Hartmann et al. | 717/132 |
| 2005/0268285 A1 | * | 12/2005 | Bagley et al. | 717/124 |
| 2006/0064570 A1 | * | 3/2006 | di Savoia | 712/227 |
| 2008/0046867 A1 | * | 2/2008 | Pal et al. | 717/131 |
| 2008/0250051 A1 | * | 10/2008 | Grechanik et al. | 707/102 |

OTHER PUBLICATIONS

David M. Cohen, Siddhartha R. Dalal, Michael L. Fredman, and Gardner C. Patton, The AETG System: An Approach to Testing Based on Combinatorial Design, IEEE Transactions on Software Engineering, vol. 23, No. 7, Jul. 1997, pp. 437-444.*
Mats Grindal, Jeff Offutt, Sten F. Andler:, Combination Testing Strategies: A Survey, GMU Technical Report ISE-TR-04-05, Jul. 2004.*
Tsong Yueh Chen and Yuen Tak Yu, A Decision-Theoretic Approach to the Test Allocation Problem in Partition Testing, IEEE Transactions on Systems, Man, and Cybernetics—Part A: Systems and Humans, vol. 32, No. 6, Nov. 2002, pp. 733-745.*
Kanglin Li, Mengqi Wu; Effective GUI Testing Automation: Developing an Automated GUI Testing Tool; Nov. 26, 2004; Sybex; 17 Pages.*
Eggplant, http://web.archive.org/web/20040612004240/www.redstonesoftware.com/, retrieved Aug. 26, 2010, 4 pages.*
Software quality engineering : testing, quality assurance and quantifiable improvement; Chapter 8; Jeff Tian; Feb. 7, 2005; 32 pages.*
US Copyright Office; Date of Publication of Software quality engineering; retrieved Aug. 26, 2010; 1 page.*
Internet print out from Compuware Corporation obtained one or more downloads from http://www.compuware.com/products/default.htm.

\* cited by examiner

*Primary Examiner* — Hyung S Sough
*Assistant Examiner* — Kimberly Jordan
(74) *Attorney, Agent, or Firm* — Fish & Richardson P.C.

(57) ABSTRACT

A system and method provide for determining optimal input combinations useable in testing program code that includes user interface intensive workflows. Various embodiments provides for determining an input set corresponding to the target program code, determining mutually exclusive feature groups corresponding to the input set and determining a set of optimal input combinations corresponding to the feature groups. A more specific embodiment provides for determining the set of optimal input combinations in accordance with a linked or unlinked gear approach.

32 Claims, 19 Drawing Sheets

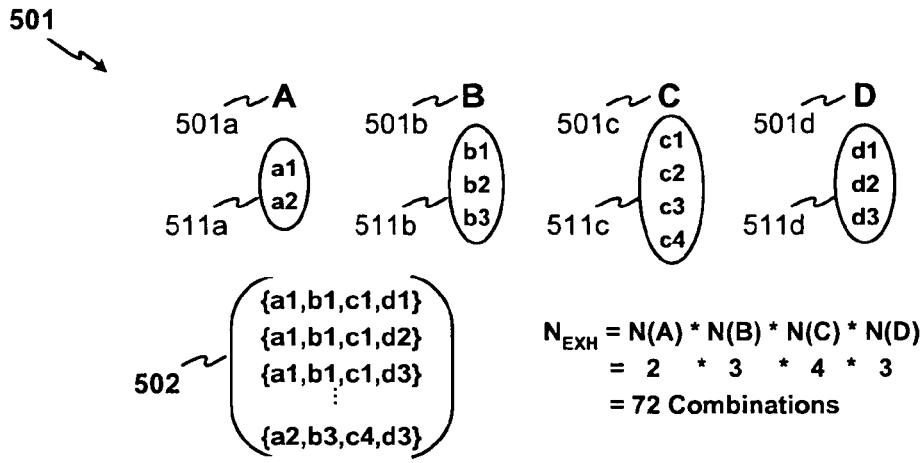
FIG. 5A
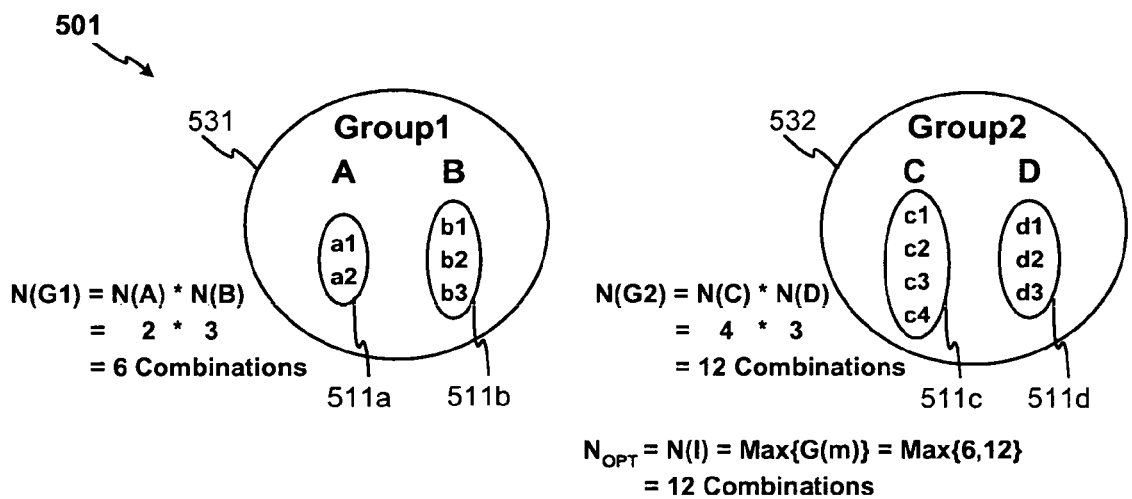
FIG. 5B1

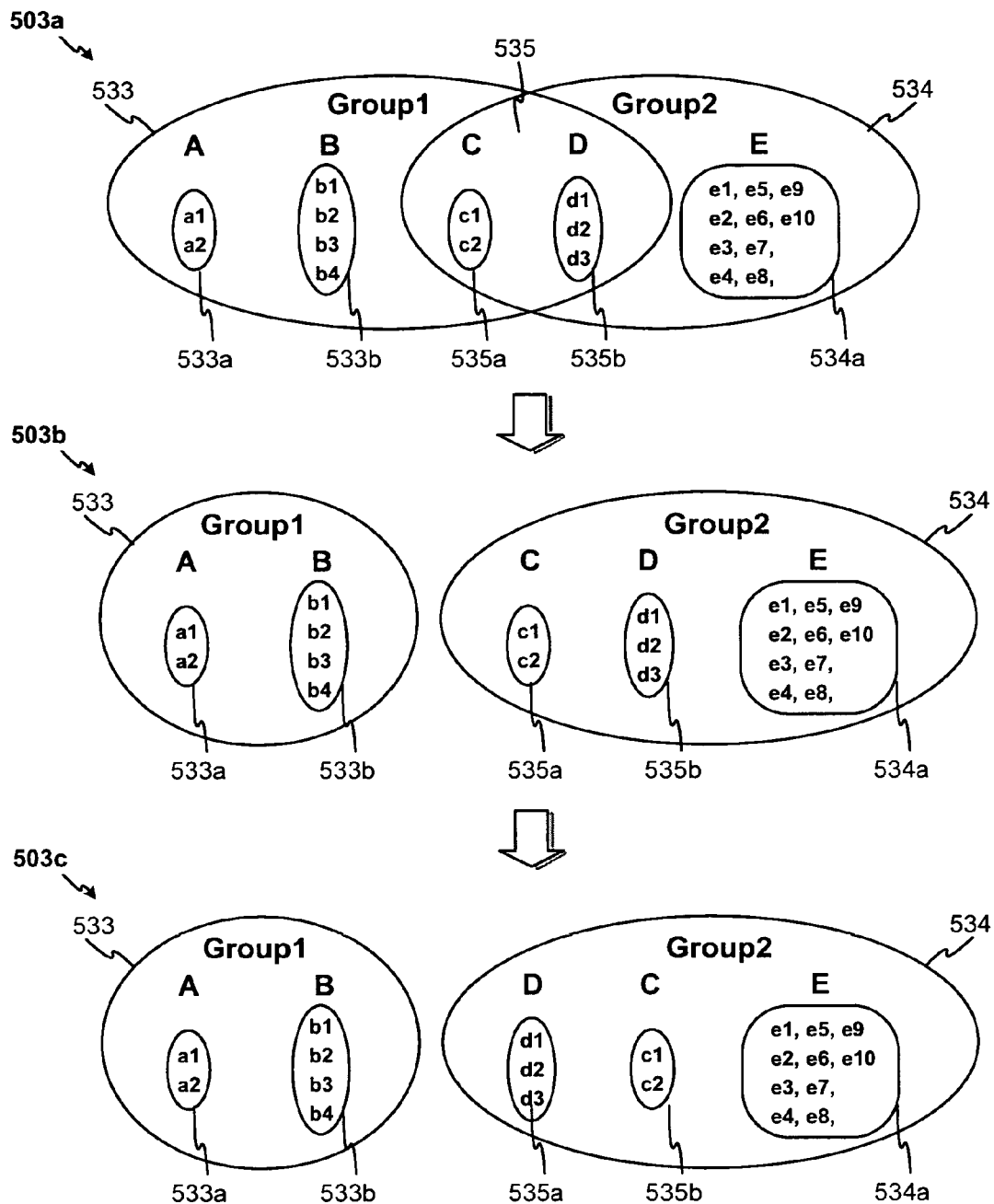
FIG. 5B2

TEST EFFORT OPTIMIZATION FOR UI INTENSIVE WORKFLOWS

BACKGROUND OF THE INVENTION

1. Field of Invention

The present invention relates in general to the field of computing and more specifically to systems and methods for enabling more optimal user interface testing to be conducted, particularly in the presence of intensive workflows.

2. Description of the Background Art

While nearly all computer programs include a user interface (UI), testing of the UI remains problematic—particularly in the presence of intensive workflows. One reason is that the number of possible input combinations for exhaustive testing of intensive workflows is extremely large. A workflow having n steps with each step having X potential input combinations represents a workflow having $X^n$ possible input combinations. A large X will therefore render fully exhaustive testing impracticable. Unfortunately, while conventional testing approaches address various specific issues, they fail to consider intensive workflows, let alone address their impact. Similar problems may also arise with regard to other testing as well.

One Risk-Based Module Testing approach, for example, calculates a confidence level for each software module. The approach relies on historical data, other metrics and other application specific knowledge to produce a risk based testing strategy incorporating resulting confidence levels. Such reliance on historical data and previous test experience, however, is only applicable to regression phases. Its suitability quickly diminishes for new products or functional testing phases where such knowledge is unavailable. Assigning a confidence level for every test case is also particularly impractical where the number of test cases or input combinations is extremely large.

Another White Box Priority approach attributed to Intel operates on application components at the application program interface or API or white box level and applies a PGO concept using profile data from previous test runs. Unfortunately, while perhaps appropriate for particular preliminary unit test runs by a development team, applying component or API level priority becomes increasingly problematic for larger test cases.

A further Compuware approach may also be applicable for smaller test cases in which a small number of input combinations is applicable. In this approach, testing activities for distributed applications are prioritized according to assigned risk. However, this approach also does not consider larger test cases, greater numbers of input combinations or the difficulties they present. Prior test data may also be required for such assignment as with the above testing approaches.

Yet another Rational Manual Tester tool provided by Intel includes a manual test authoring and execution tool. The tool provides for reusing test steps, thereby reducing the impact of software change on testers and business analysis. However, while the testing tool appears to operate as an effective test execution tracker, larger test cases are not even considered, let alone accommodated.

Each of these approaches is also directed at only module operation defects according to an existing intensive understanding of where such defects have tended to arise. Such approaches may therefore fail to provide comprehensive yet practical operational testing, which may begin to explain the numerous errors encountered by users, among still further problems.

Accordingly, there is a need for a software testing system and methods that enable one or more of the above and/or other problems of existing software testing to be avoided.

BRIEF DESCRIPTION OF THE DRAWINGS

FIG. 5a illustrates an exhaustive input set generation operation that may be performed by a target analyzer, according to an embodiment of the invention;

FIG. 5b1 illustrates a feature group mutual exclusivity detection operation that may be performed by a grouping engine and feature groups that detected as mutually exclusive, according to an embodiment of the invention;

FIG. 5b2 illustrates a feature group mutual exclusivity assurance operation that may be performed by a grouping engine to detect and correct overlapping and not mutually exclusive feature groups, according to an embodiment of the invention;

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A "computer-readable medium" for purposes of embodiments of the present invention may be any medium that can contain and store the computer program for use by or in connection with the instruction execution system, apparatus, system or device. The computer-readable medium can be, by way of example only but not by limitation, a semiconductor system, apparatus, system, device, or computer memory.

Figure 1:
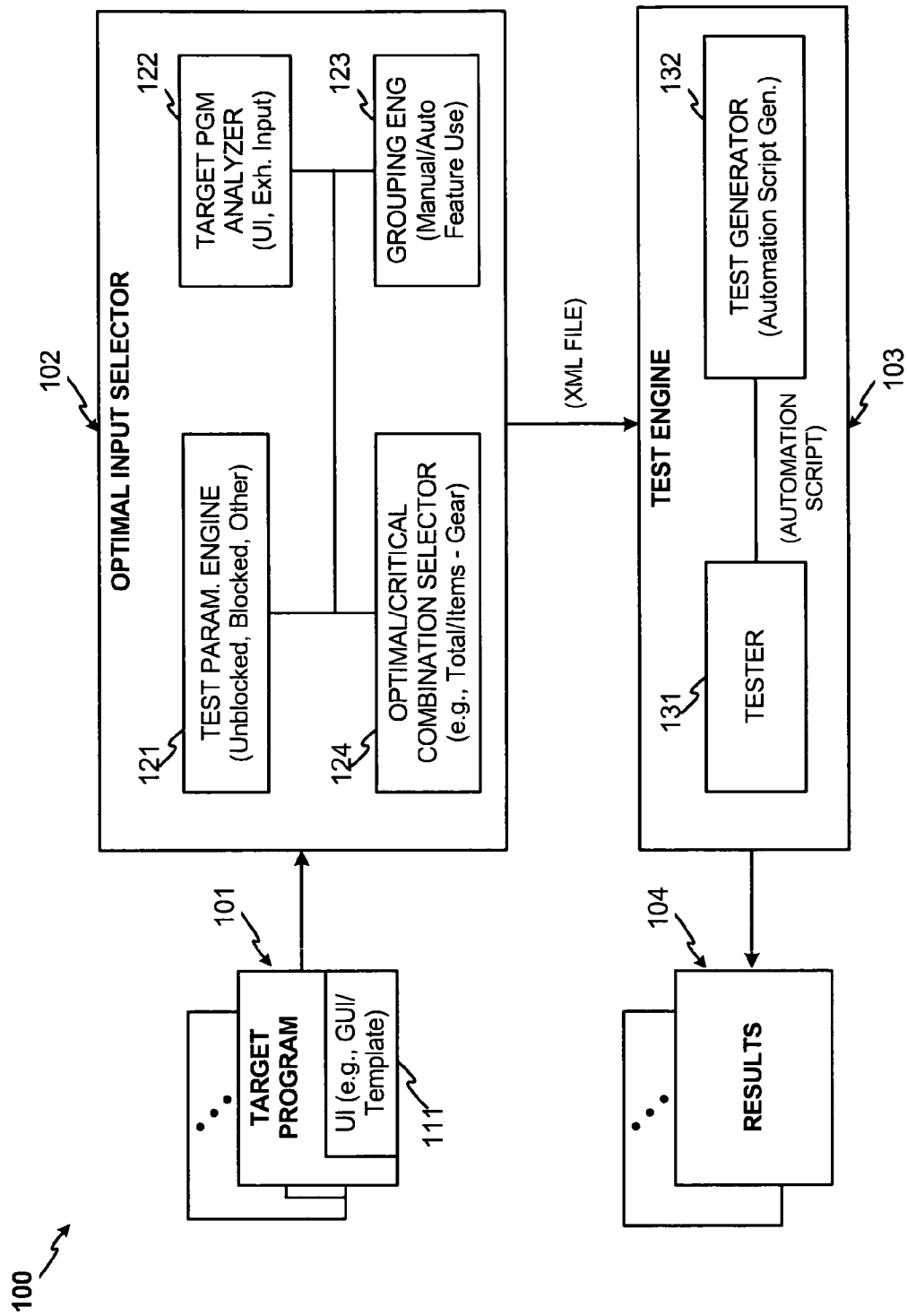
FIG. 1 is a flow diagram illustrating a test optimizing system according to an embodiment of the invention.

Referring now to FIG. 1, there is seen a flow diagram illustrating a test optimization system (test system) 100 according to an embodiment of the invention. Test system 100 provides for analyzing one or more target computer programs (program code) 101, and determining therefrom optimal input combinations that may provide for feature exhaustive testing of the target program code. (It will become apparent that test system 100 may also be used in a similar manner for testing related circuits, components or other hardware system portions or some combination of hardware and software.) Test system 100 may also provide for generating a testing procedure or other testing criteria corresponding to the optimal input combinations, and may provide for storing, transferring or utilizing the automation script to conduct testing of the target computer program 101. The optimal input combinations may, for example, comprise an optimal input combination set (OICS).

In more specific embodiments, the input set may comprise an exhaustive set of potential inputs including all inputs of one or more targeted input fields or other input controls of one or more target pages, a workspace or other portions of a target program code 101. The groupings or "feature groups" may include automatically (e.g., programmatically) or user selectable use-based groupings of operable program features from the perspective of a user, e.g., forming macro feature groupings, and are more preferably selected and associated with corresponding input set inputs or input controls as mutually exclusive feature groups. The optimal input combinations may be automatically selectable as feature exhausting (i.e., providing for testing of substantially all features of program code 101) or directed to specific target program code features or some other input exhaustive input portion, and may include a subset of the input set according to predetermined or user-selectable test system parameters. Optimal input combinations may, for example, be automatically selected through the use of a below discussed linked or unlinked gear approach or test system parameters, or some combination may be used.

Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise.

As shown in FIG. 1, test system 100 includes optimal input selector 102 and test engine 103. Optimal input selector 102 broadly provides for determining feature-group based optimal input combinations selected from an input set of target program code (or hardware) inputs, while test engine 103 provides for generating test criteria, or further, for storing, transferring or conducting testing of the target program code according to the optimal input combinations.

Within optimal input selector 102, test parameter engine 121 provides for automatic (e.g., programmatic) or user determinable test optimization parameter (test system parameter) selection according to which other system 100 operations may be conducted. Test system parameters may, for example, include selectable criteria for identifying one or more target program code portions to be tested, timing to be employed for corresponding operation(s), storage or transfer constraints, target or result information sources or destinations, grouping/OICS modifications, other test criteria or some combination, in accordance with the requirements of a particular application. Target program code identification parameters may, for example, include specifying for inclusion or exclusion user interface (UI) inputs, input controls, input types or input control types that may, for example, include one or more of UI pages, specific inputs/controls, entire workflows, unblocked or blocked inputs, test values, logic, outputs, and so on, or portions or combinations thereof.

Figure 5C:
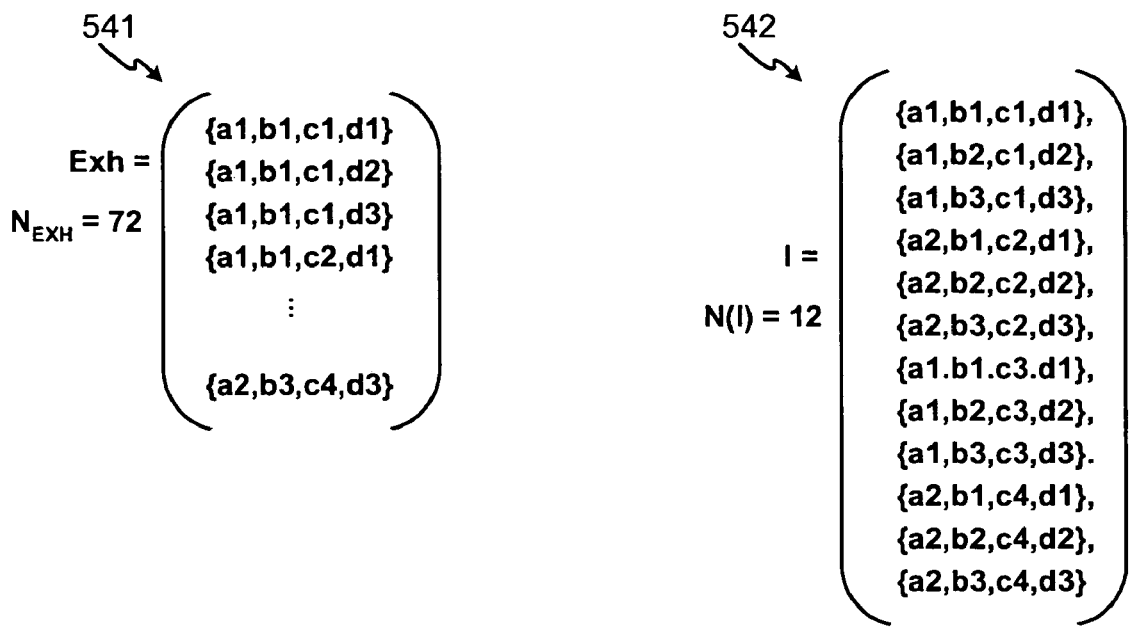
FIG. 5c illustrates examples of an exhaustive input combination set and an optimal input combination set according to an embodiment of the invention.

The depicted UI 600a of FIG. 5a, for example, may includes a first targeted UI page 600b, or one or more additionally targeted UI pages 600c, which page(s) may comprise an overall workflow of target program code 101 (FIG. 1) or some workflow portion. Page 600b further includes input controls 611-684, i.e., or I/O controls, each of which may provide for default, automatically selectable, user-selectable, enter-able or otherwise definable input options or some portion thereof that may be used as a single-input or multiple-input input combination. UI 600a may, for example, be implemented using one or more of dedicated code, templates or wizards, other suitable mechanisms or some combination.

In accordance with an embodiment of the present invention, a combination of one or more inputs may be viewed as defining a user-accessible program feature or macro feature. The use of such a combined-input feature may, for example, cause an immediate result or may cause presenting of one or more other UI interface portions (hereinafter pages) from which selections may similarly be made, and so on. An extended grouping of inputs or input combinations may also be viewed as together defining a workflow of potential inputs, responses or determinable operations of the target program code, or as providing for causing corresponding values to be implemented, corresponding logic to be executed or corresponding output to be produced, which may be included or excluded from further test system operations according to test system parameter selection.

Returning to FIG. 1, target program analyzer 122 provides for selecting an input set from which feature groups may be populated or an association formed, and optimal input combinations may be determined. In one embodiment, target program analyzer 122 is operable in a predetermined manner for selecting an exhaustive set of inputs, or input exhaustive set, of a target program. The exhaustive input set includes all potential input values of all targeted inputs. In this embodiment, test parameters may be operative for determining feature groups, optimal input combinations or other tester 100 operations. In another embodiment, target program analyzer is operable responsive to one or more user-selectable test system parameters that may affect input set selection. Input parameters may, for example, direct the inclusion (or exclusion) of an exhaustive set of only unblocked or only blocked inputs; only blocked, unblocked or other specifiable inputs of one or more input controls, UI pages, a workflow or portions thereof, among various other examples.

Target program analyzer 122 may, for example, automatically analyze a template, list, Java or other UI descriptor, or other input definition (i.e., or assignment) code by retrieving from storage or otherwise receiving and parsing the code. Target program analyzer 122 may also conduct target program analysis via memory parsing, a target program code application program interface (API), and so on, or other mechanisms or some combination may be used in accordance with the requirements of a particular application.

Grouping engine 123 provides for automatic or user selection of feature groups corresponding to a target program UI and for associating the feature groups with corresponding portions of the input set. In one embodiment, the feature groups are selected as corresponding with combinations of one or more input controls that define a discernable target program feature from the perspective of a target program code user.

Feature groups may, for example, be automatically or otherwise selected in accordance with analyzing an available input definition file that provides grouping or feature indicators, which indicators may be implemented in accordance embodiments of with the present invention. Feature groups may also be selected by analyzing a presentation layout, a combined selection requisite for specifying an overall input condition or producing a corresponding result or condition, and so on, or some combination.

Different test system users may also select different feature groups while still exploiting advantages of the present invention, since the present invention enables a degree of flexibility in such selection. For example, different users may select different feature groups corresponding to differently perceived features in complex cases that may arise. Feature groups may also be automatically or user determined according to test system parameters indicating a finer or coarser granularity or recursive selection as desired. It is found, however, that viewing a target program code from a use perspective (e.g., rather than a logical flow or raw risk analysis) will tend to produce substantially similar results or enable similar advantages with bases for variability being generally apparent.

A further grouping engine 123 embodiment provides for assuring that determined feature groups are mutually exclusive, for example, through the use of an ordered largest group or other mechanism. (See, for example, FIGS. 4a through 6 and 10b below.)

Optimal input combination selector 124 provides for selecting from the input set a subset of potential input combinations that are representative of the potential inputs of the target program code. The optimal input combinations may, for example, be representative of substantially all program features (feature exhaustive) and may be determined in accordance with a gear approach selection (e.g., see below) or other suitable mechanism for assuring that substantially all such features are represented and may therefore be tested.

Within test engine 103, test generator 132 provides for generating a testing procedure corresponding to the optimal input combinations. The testing procedure may, for example, include an automation script that integrates the optimal input combinations as a test group for use by a pre-existing or then generated test program, or other suitable hardware/software mechanisms, or some combination may also be used. Tester 131 provides for conducting storage, transfer or testing of the optimal input combinations, and may include the aforementioned pre-existing or then generated testing mechanism. Results 104 may include the input set, groupings, optimal input combinations, test results, test parameters or other information corresponding to test system 100 operation.

Figure 2:
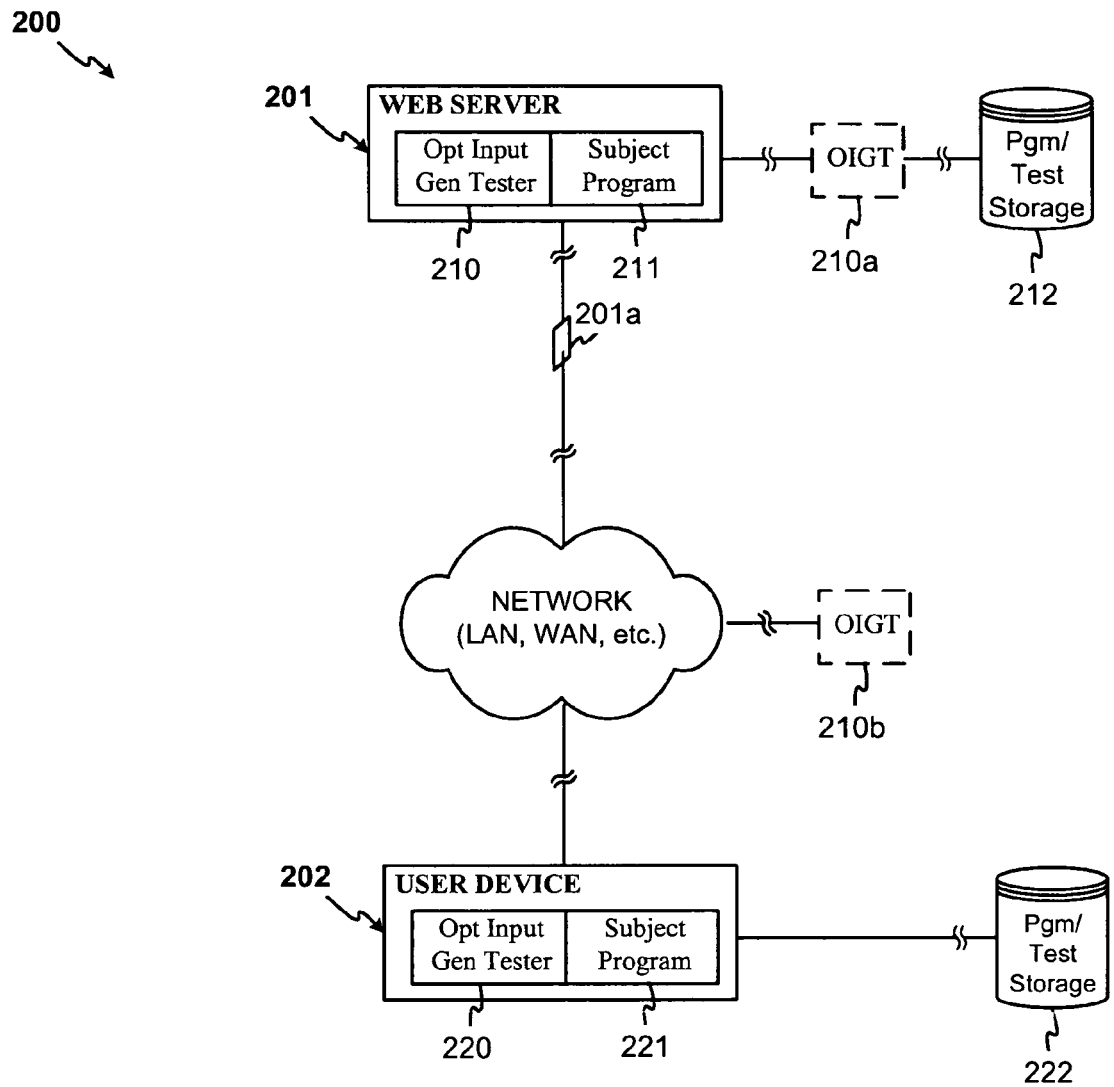
FIG. 2 is a flow diagram illustrating a network environment employing a test optimizing system according to an embodiment of the invention.
Figure 3:
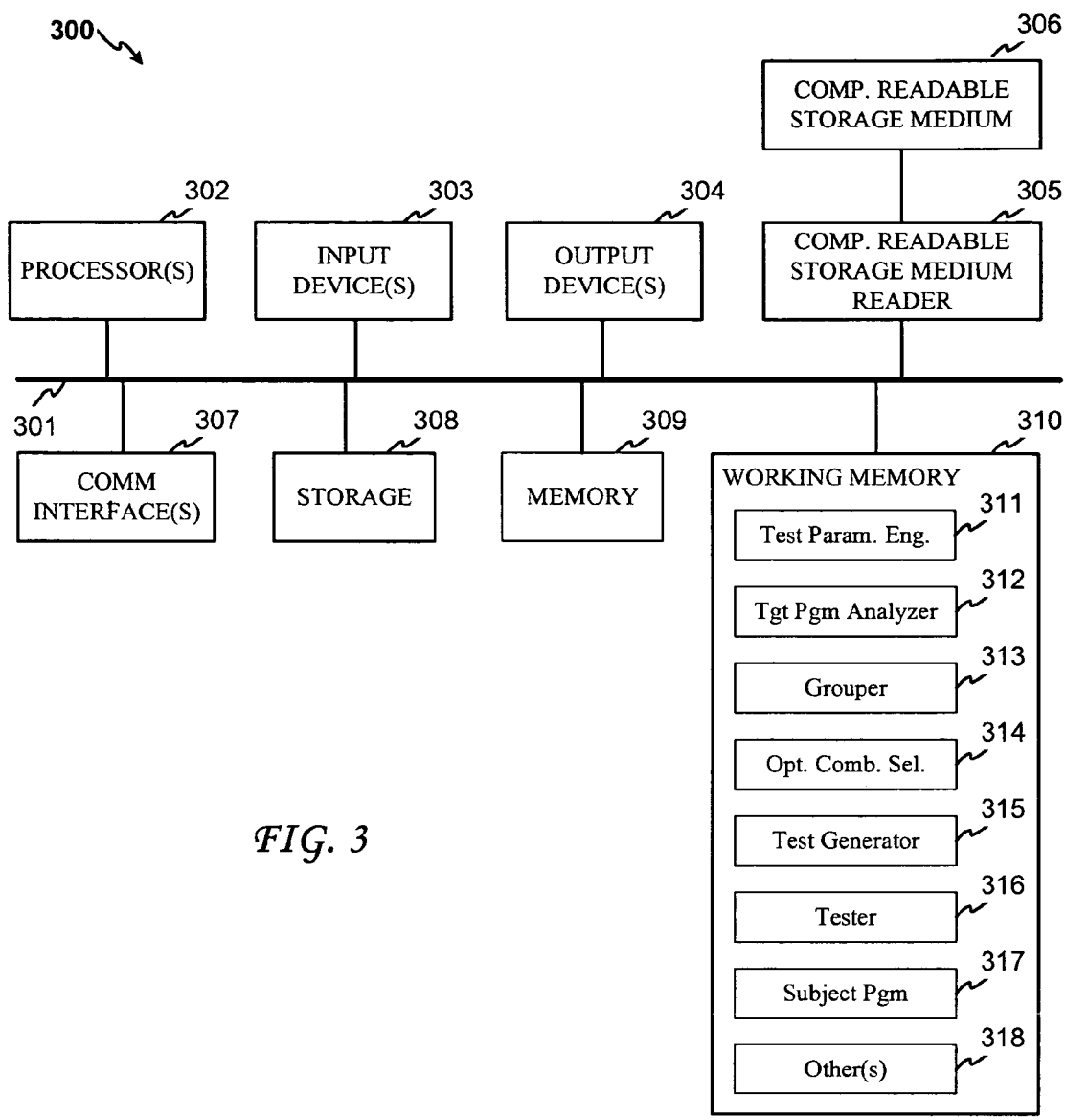
FIG. 3 is a schematic diagram illustrating an exemplary computing system including one or more of the components of FIGS. 1 and 2, according to an embodiment of the invention.

FIGS. 2 and 3 illustrate examples of how testing system 100 of FIG. 1 or portions thereof may be implemented in a variety of manners in accordance with the requirements of a particular application.

The FIG. 2 example illustrates how test system 100 may be implemented in a more integrated or more distributed manner in conjunction with one or more devices. Test system 100 may, for example, be implemented by a remote device, such as with optimal input enabled tester (OIGT) 210 of web server 201, or the remote device or some other device, e.g., 210a, 210b, may perform one or more of the aforementioned testing operations in conjunction with target program code or a portion thereof that may be stored or received by web server 201. Test system 100 may also be implemented in whole or part in conjunction with uploadable or downloadable code or applets, servlets or other mobally executable code that is implemented or controllable via web server 201 or user device 202, among other combinable alternatives. Web server 201, user device 202 or one or more other devices may also implement test system 100 in a local or remote manner, or some combination may be utilized in accordance with the requirements of a particular application.

Network 202 may, for example, comprise one or more of suitable fixed or reconfigurable physical or virtual networks including local area networks (LANs), private networks, wide area networks (WANs, e.g., the Internet), and so on, or some combination. Within network 202, firewall 201a is illustrative of a wide variety of security mechanisms, such as firewalls, encryption, fire zone, compression, secure connections, one or more of which may be used in conjunction with various system 100 or system 200 components. Many such mechanisms are well known in the computer and networking arts.

The FIG. 3 example further illustrates a computing system that may comprise one or more of the components of FIGS. 1 and 2. While other alternatives might be utilized, it will be presumed for clarity sake that components of systems FIG. 1, FIG. 2 and elsewhere herein are implemented in hardware, software or some combination by one or more computing systems consistent therewith, unless otherwise indicated.

Computing system 300 comprises components coupled via one or more communication channels (e.g. bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application.

System 300 also includes a computer readable storage media reader 305 coupled to a computer readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, partially or fully hardened removable media, read only memory, random access memory, cache memory, and so on, in accordance with the requirements of a particular implementation. One or more suitable communication interfaces 307 may also be included, such as a modem, DSL, infrared, RF or other suitable transceiver, and so on for providing inter-device communication directly or via one or more suitable private or public networks or other components that can include but are not limited to those already-discussed.

Working memory 310 further includes operating system ("OS") 311, test parameter engine 312, grouping engine 313, optimal combination selector 314, test generator 315, tester 316 and may include other programs 317, which may be stored or loaded therein during use. The particular OS may vary in accordance with a particular device, features or other aspects in accordance with a particular application, e.g., using Windows, WindowsCE, Mac, Linux, Unix, a proprietary OS, and so on. Various programming languages or other tools may also be utilized, such as those compatible with C variants (e.g., C++, C#), the Java 2 Platform, Enterprise Edition ("J2EE") or other programming languages. Such working memory components may, for example, include one or more of applications, add-ons, applets, servlets, custom software and so on for conducting but not limited to the examples discussed elsewhere herein. Other programs 317 may, for example, include one or more of security, compression, synchronization, backup systems, groupware code, and so on, including but not limited to those discussed elsewhere herein. Other programs 317 may also include a network client (e.g., browser) or other program code for conducting control or other I/O in conjunction with a remotely operable test system.

When implemented in software, a testing system or other component may be communicated transitionally or more persistently from local or remote storage to memory (SRAM, cache memory, etc.) for execution, or another suitable mechanism may be utilized, and elements can be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

FIGS. 4*a* through 4*d* with reference to FIGS. 5*a* through 5*d* illustrate, in greater detail, embodiments of test parameter engine 121, target program analyzer 122, grouping engine 123 and optimal input combination selector 124 of test system 100 of FIG. 1.

Figure 4A:
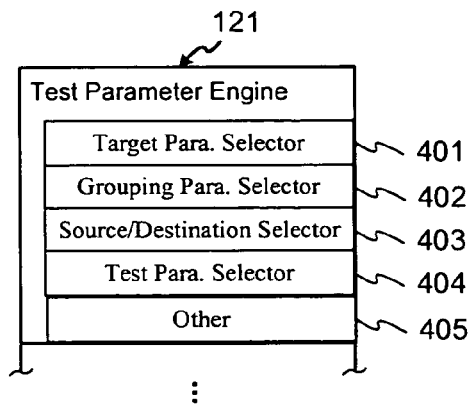
FIG. 4a is a schematic diagram illustrating, in greater detail, the test parameter engine of FIG. 1, according to an embodiment of the invention.

Beginning with FIG. 4*a*, test parameter engine 121 includes target program code selector (target selector) 401, grouping criteria selector 402, source-destination criteria selector 403, test parameter selector 404 and other criteria selector 405. Target selector 401 provides for identifying target program code and one or more input sets or other targets within the program code for which test system 100 is to determine test criteria or conduct testing. (It will be appreciated that input sets may also represent hardware or some combination of hardware and software.) Selecting may, for example, include test system 100 providing an interactive parameter selection UI to a user or receiving fixed or variable criteria (e.g., default or preferred target, source/destination or other information) useable by system 100 for selecting one or more programs, program code portions, or other target selection criteria.

Grouping selector 402 may similarly provide for selection of feature groups, for example, by presenting an interactive grouping UI (e.g., graphic, list-based, and so on) for user selection of feature groups or by providing fixed or variable criteria useable by system 100 for selecting feature groups. Source-destination criteria selector 403 may similarly provide an interactive source-destination UI or fixed or variable criteria for test system 100 selection of a memory, storage or device test system input source, test system output destination, user location(s)/permission(s) and so on, while test parameter selector 404 similarly provides for selection of optimal input combination selection mechanism(s), varying a number of optimal input combinations (sample size), preferred test conditions, and so on. Other criteria selector 404 may similarly provide for selection of test set determining, testing or other criteria that may be utilized in accordance with the requirements of a particular application.

Figure 4B:
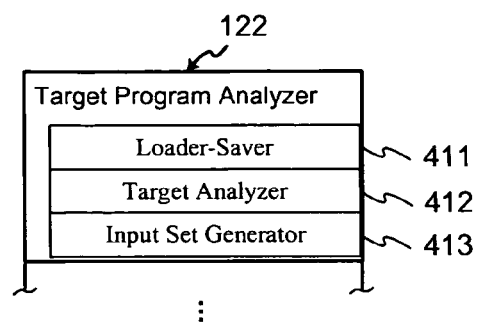
FIG. 4b is a schematic diagram illustrating, in greater detail, the target program analyzer of FIG. 1, according to an embodiment of the invention.

FIG. 4*b* further illustrates how exemplary target program analyzer 122 includes loader-saver 411, target analyzer 412 and input set generator 413. Loader-saver 411 provides for receiving target program code according to which test system 100 operations may be conducted. The program code may be retrieved or otherwise received from permanent storage, temporary storage, another device or some combination, and may include an interface definition file or other UI data corresponding to a target program, e.g., as was already discussed. Loader-saver 411 may also provide for receiving test system parameters that may be identified by test parameter engine 121, or for providing such parameters to other target program analyzer components for conducting respective operations in accordance with the received test system parameters. Target analyzer 412 further provides for analyzing the received program code and determining therefrom elements of a corresponding input set, while input set generator 413 provides for determining an input set from the inputs provided by target analyzer 412.

As shown in FIG. 5*a*, for example, target analyzer 412 may produce an input set from a target program code UI page or workflow portion. In this example, target analyzer 412 analyzes a received program code UI definition according to a feature exhaustive test parameter, and determines that the UI includes 4 input controls: A, B, C and D. Target analyzer 412 analysis of the input controls further indicates that input controls A through D 501*a-d* provide for 2, 3, 4 and 2 inputs respectively, and input set generator 413 creates an input set 511*a-d* including the input control A through D inputs. Target analyzer 412 may also calculate a total number of input exhaustive input combinations, for example, as given by equation 1:

$$N_{Exh}=N(IC_1)*N(C_2)* \ldots N(IC_n) \qquad \text{Equation 1}$$

wherein $N_{Exh}$ indicates a total number of input combinations as a product of the total number of input options or inputs for each input control. Such calculations, in this instance, reveal that fully exhaustive testing of even this simple UI would require testing of 2*3*4*2 or 72 input combinations.

Figure 4C:
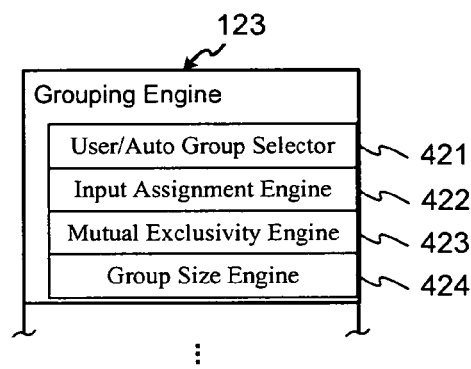
FIG. 4c is a schematic diagram illustrating, in greater detail, the grouping engine of FIG. 1, according to an embodiment of the invention.

FIG. 4*c* further illustrates how exemplary grouping engine 122 of FIG. 1 may include user/automatic group selector 421, input assignment engine 422, mutual exclusivity engine 423 and group size engine 424. Group selector 421 provides for managing a group selection UI in embodiments in which group selection may be conducted by a system 100 user. The group selection UI may, for example, provide for presenting to a user one or more of a target program UI listing, layouts, and so on, and enable a user to check off, box or otherwise indicate a selection and association of input controls or corresponding inputs and their inclusion in a particular feature group. The UI may further provide for user or automatic generation of a feature group identifier corresponding to each feature group. Automatic group selection may, for example, be conducted in accordance with meta input control identifiers, UI layout analysis, use of templates/wizards, and so on, e.g., as is discussed elsewhere herein, or may be conducted in another suitable manner or some combination. Input assignment engine 422 provides for associating, with a corresponding feature group, user or automatically selected inputs corresponding to each input control that is associated with or otherwise included in a particular feature group.

Mutual exclusivity engine 423 provides for assuring that each of inputs included in the feature groups formed via group selector 421 include independent and non-overlapping inputs, and are therefore mutually exclusive. FIG. 5*b*1, for example, illustrates how engine 423 may compare controls 501*a-d* that are included within feature groups 531 and 532, and determine that the input controls and input control inputs 511*a-d*, are non-overlapping. (Note that mutual exclusivity of the present example is conducted irrespective of different inputs that may include an equivalent input option, so long as an input control instance, and thus an instance an included input, is non-overlapping.)

Mutual exclusivity engine 423 may conversely determine that feature groups 503*a* of FIG. 5*b*2 include common inputs of common input controls 535 and are therefore not mutually exclusive. Mutual exclusivity engine 423 may further provide for causing mutual exclusivity by removing one or more overlapping conditions.

Mutual exclusivity engine 423 (FIG. 4*c*) may, for example, assure mutual exclusivity by removing an overlapping condition in accordance with an ordered size approach. Using such an approach, engine 423 may invoke group size engine 424 for determining a largest overlapping feature group using equations 2 and 3, wherein:

$$S(Gn)=N(IC1)*N(IC2)* \ldots *N(ICn), \qquad \text{Equation 2 and}$$

$$G(\text{Largest})=\text{Max}\{G1,\ldots Gn\}. \qquad \text{Equation 3}$$

In accordance with equation 2, the size of a feature group, S(Gn) equals the product of the number of inputs for all input controls in the group, or alternatively, the number of input combinations provided by the feature group. Thus, the size of the FIG. 5*b*2 group-1 533 is 2*4*2*3 or 48 input combinations, while the size of group-2 534 is 2*3*10 or 60 input combinations. Equation 3 further shows how the largest group, G(Largest) is determined as the overlapping feature group having the maximum number of input combinations. Thus, the largest feature group between group-1 533 and group-2 534 is Max{G1, G2} or Max{48, 60}=60 input combinations, and group-2 534 is the largest of the overlapping feature groups.

Mutual exclusivity engine 423 (FIG. 4*c*) may also, in further accordance with an ordered size approach, provide for causing the overlapping inputs to be associated with only the largest overlapping group e.g., adding/deleting inputs as needed or modifying their group association, resulting in grouping 503*b*. Mutual exclusivity engine 423 may further provide for assuring that the previously overlapping inputs are ordered in the remaining feature group from the largest to smallest number of inputs corresponding to an input control. Thus, engine 423 may order the inputs with respect to one another within group-2 as the three inputs corresponding to input control-D 535*a* followed by the two inputs corresponding to input control-C 535*b*, resulting in grouping 503*c*. For clarity sake, the inputs corresponding to a particular input control may also be referred to herein as an input subset or input control inputs.

Figure 4D:
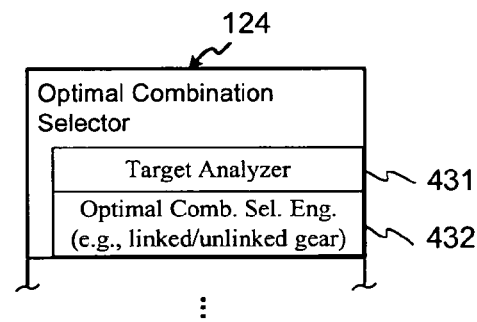
FIG. 4d is a schematic diagram illustrating the optimal input combination selector.

FIG. 4*d* further illustrates how an exemplary optimal combination selector 123 of FIG. 1 may include optimal combination identifier 431 and optimal combination manager 432. Optimal combination identifier 431 provides for determining optimal input combinations as a portion or subset of a current input set. In one feature exhausting embodiment, optimal combination identifier 431 is operable according to a linked gear approach given by equation 4. In this example, $G_{Max}$ indicates a feature group having a maximum number of inputs, j indicates a current input of $G_{Max}$, N indicates a size of $G_{Max}$, Cur indicates a current input of a corresponding feature group and m indicates a total number of feature groups.

$$\{G_{Max}(j) \& G2(\text{Cur}) \& G3(\text{Cur}) \& \ldots \& Gm(\text{Cur})\} \qquad \text{Equation 4}$$

Where j=1 to N.

A gear approach embodiment may therefore be implemented in accordance with the following Equation 4a. In equation 4a, let N, p, q, r . . . x be the size of Groups Gmax, G1, G2, G3 . . . Gm, such that:

$$OICS=\{G\text{Max}(j) \& G1(j \bmod p) \& G2(j \bmod q) \& \\ G3(j \bmod r) \& \ldots \& Gm(j \bmod x)\} \text{ Where } j=1 \\ \text{to } N \qquad \text{Equation 4a}$$

Figure 5D:
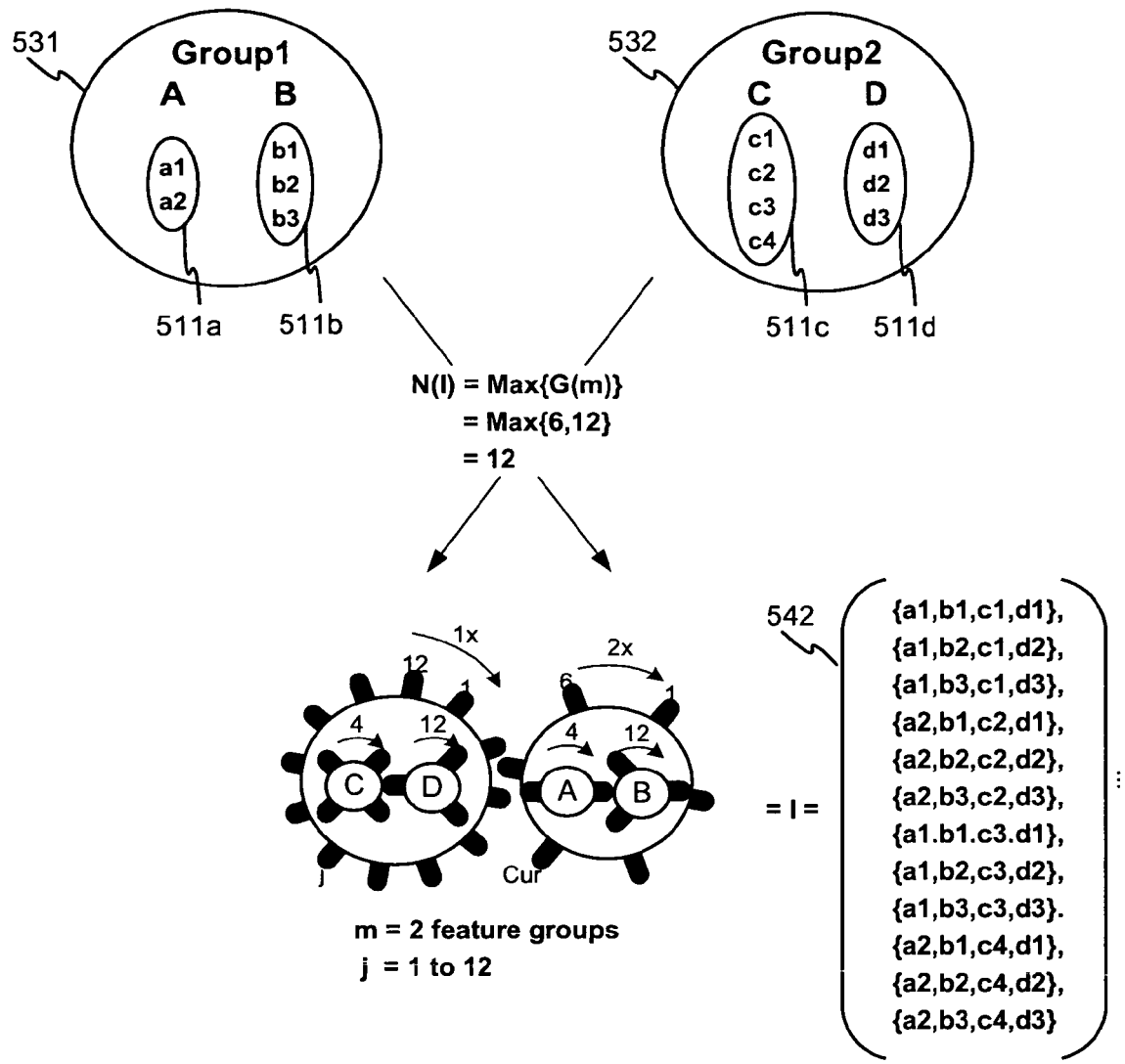
FIG. 5d illustrates application of a linked gear approach to determining a feature exhaustive optimal input combination set, according to an embodiment of the invention.

Application of the linked gear approach may accordingly provide for determining a number of optimal input combinations corresponding to at least the size of the largest feature group, or stated alternatively, at least one cycle of a largest gear corresponding to the largest feature group. Thus, turning all gears at the same time for one rotation of the largest feature group gear, each input combination will include a unique current input combination from the largest feature group (the gear for which cycles once completely) and a potentially repeated current input combination from all other feature groups (which may turn for more than one complete cycle). FIG. 5*d* illustrates how such rotation rotates input sets C, D, A and B 4 times, 12 times, 4 times and 12 times respectively, and produces optimal input combinations set 542. (The specific ordering of input sets is not needed for non-overlapping groups)

It should be noted, however, that the present embodiment may presume a relationship between the positions of the input sets and the successive repetition of the elements of the input sets while forming exhaustive input combinations. For example, let 1, 2, 3, . . . n be the positions of the input sets I1, I2, I3, . . . In in a group G. Group G may thus be represented as G{I1, I2, I3, . . . In}. The number (Nj) of successive combinations in which each element of these input sets will occur continuously may therefore be determined according to Equation 5:

Equation 5:

$$Nj = n(Ij+1) * n(Ij+2) * \ldots * n(In) = \prod_{K=j+1}^{n} (Ik),$$

wherein $1 \leq j \leq n-1$ and Nj=1 when j=n. Note, with regard to Equation 5, that the symbol Π represents "product of" and Nj is the number of successive combinations in which each element will occur for an input set at the jth position in a Group. Additionally, the elements of the input set positioned last or nth input set will not be repeated continuously in the successive combinations.

Figure 6A:
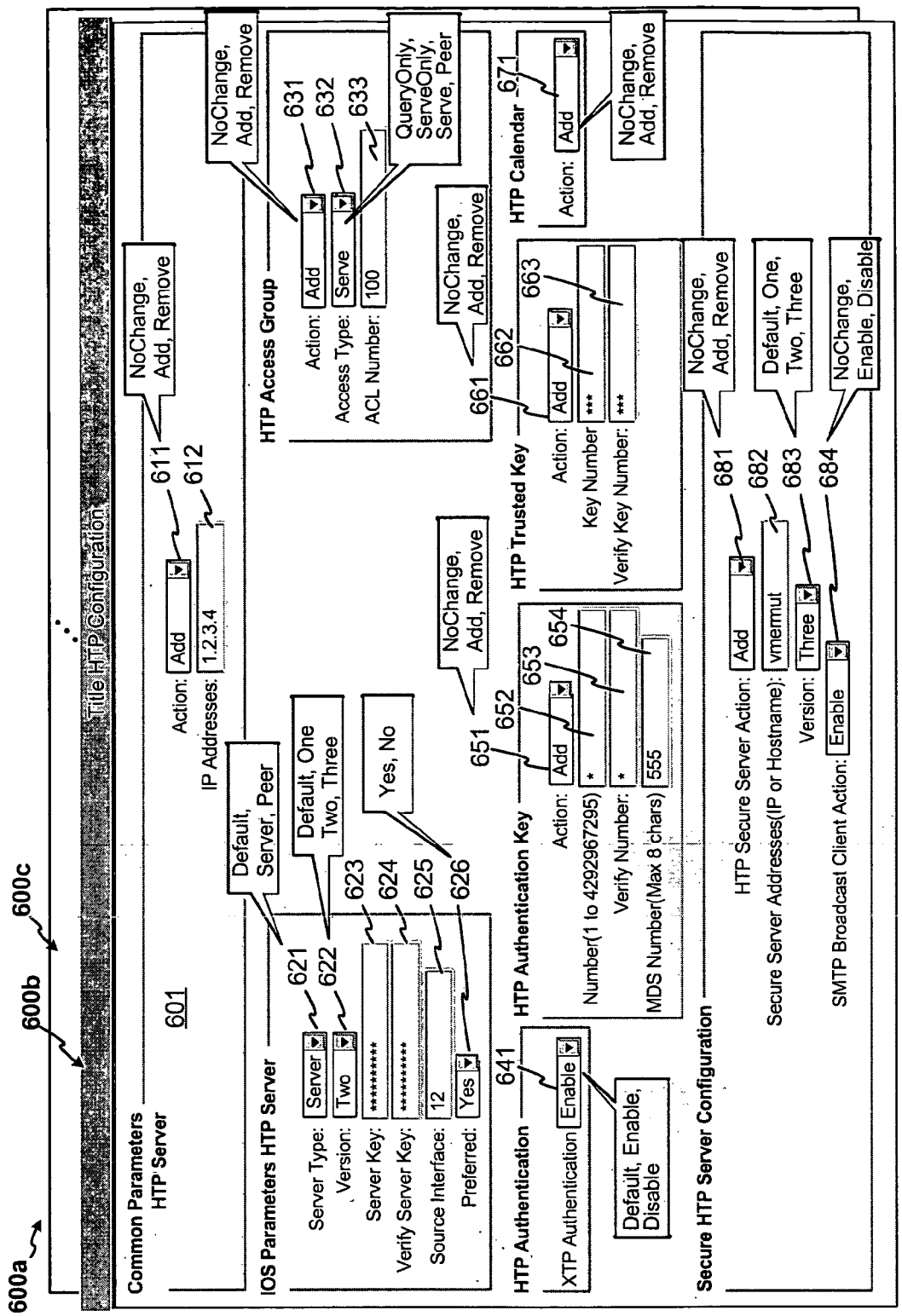
FIG. 6a illustrates an example of an input set determination operation in conjunction with a target program UI page or workflow, according to an embodiment of the invention.
Figure 6B:
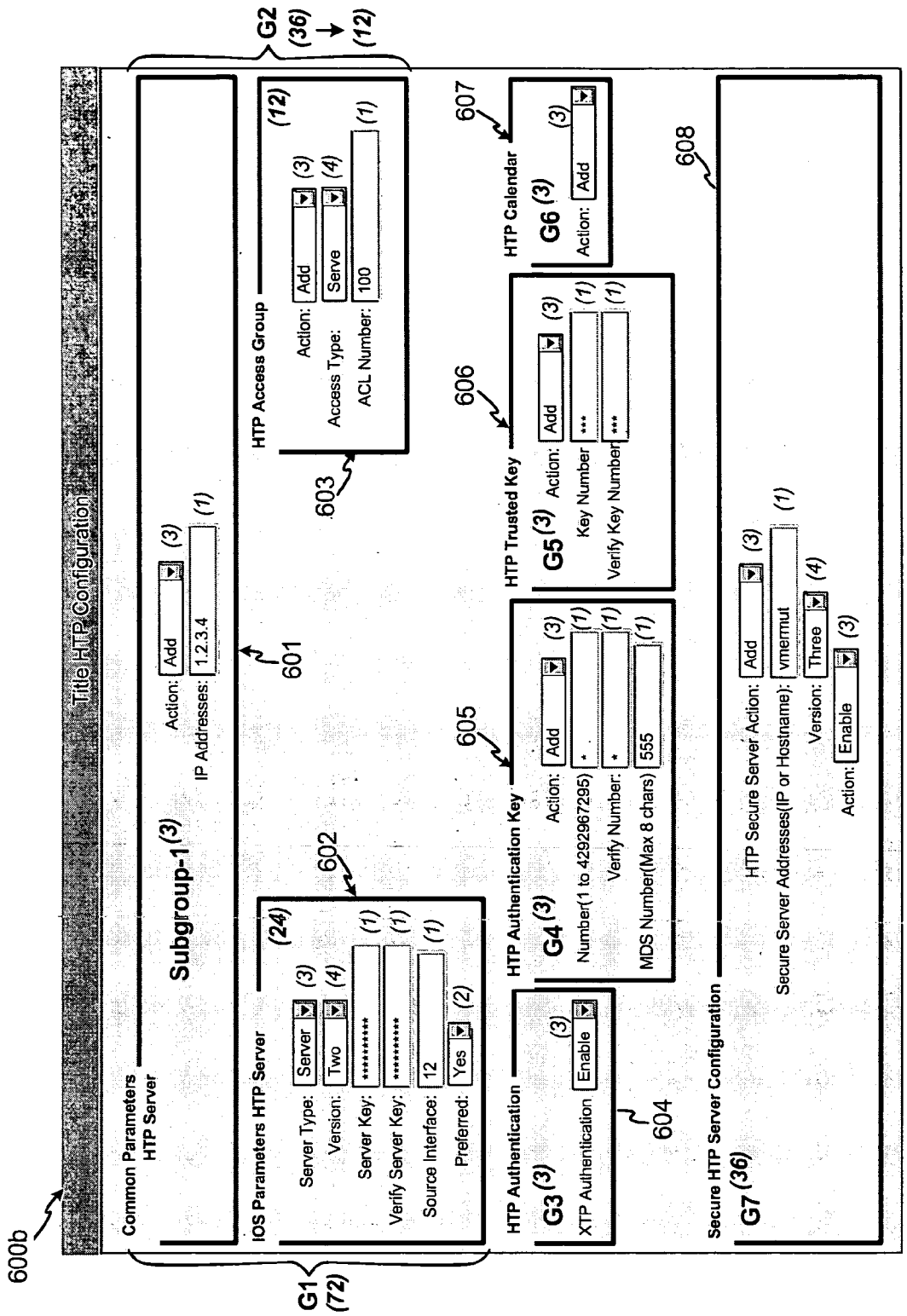
FIG. 6b illustrates examples of feature grouping and absolute and relative group size determination operations in conjunction with a target UI page or workflow, according to an embodiment of the invention.

FIGS. 6a and 6b illustrate a more specific test system operation example. In this example, test system 100 may determine optimal input combinations for exhaustive feature testing of unblocked inputs of a target UI page 600b in a target program code workflow 600a.

Beginning with FIG. 6a, target program analyzer 122 (FIG. 4b) may identify 24 input controls 611 through 684 as being included in target UI page 600b, which input controls comprise numbers of input options as follows: 611=3, 621=3, 622=4, 626=2, 631=3, 632=4, 641=3, 651=3, 661=3, 671=3, 681=3, 683=3 and 684=3. Each of the remaining input controls includes only 1 potential input. Thus, the total number of input combinations that may be required for exhaustive input combination testing of UI page 600b equals the product of total inputs for all of input controls 611-684 or 7,558,272 input combinations.

However, in accordance with an feature exhaustive testing embodiment of test system 100 (FIG. 1), target program analyzer 122 may utilize input control 611-684 inputs as an input set from which an optimal input combination set may be determined. Continuing with FIG. 6b, grouping engine 123 (FIG. 4c) may further associate the input controls and corresponding inputs with feature groups G1-G7. Grouping engine 123 may also identify subgroup1 601 as an overlapping control of IOS Parameter and HTP Access selection 602, 603, and may impose feature group exclusivity. Using an ordered size approach, for example, equation 3 reveals that Max{(G1, G2)} equals Max {72, 36}, and G1 is the larger feature group. Subgroup1 may therefore be deleted from G2 and ordered in G1 as the larger action input control 611 inputs followed by the smaller IP addresses input control 612 inputs.

(It should be noted that the ordered size approach of the present embodiment is only applicable to overlapping input sets, and in any group, overlapping input sets take precedence over non-overlapping input sets. Thus, for example, overlapping input control 611, 612 would take precedence over other non-overlapping input controls 621, 622 . . . 626 in Group G1. Subgroup 1 should therefore be positioned first and then the 602 inputs.)

Combination selector 124 (FIG. 4d) may farther determine that G1 is also the largest feature group, i.e. of all target feature groups, since Max {G1, G2, . . . Gm} equals Max {72, 12, 3, 3, 3, 3, 36} or 72 G1 input combinations, and may form an optimal input combination set, for example, using the above-mentioned linked gear approach. Test system 100 may therefore provide for conducting reliable testing of UI page 600b in accordance with 72 feature exhaustive optimal input combinations rather than 7,558,272 raw exhaustive combinations or resorting to risk based or other more time intensive or less reliable approaches.

Figure 7A:
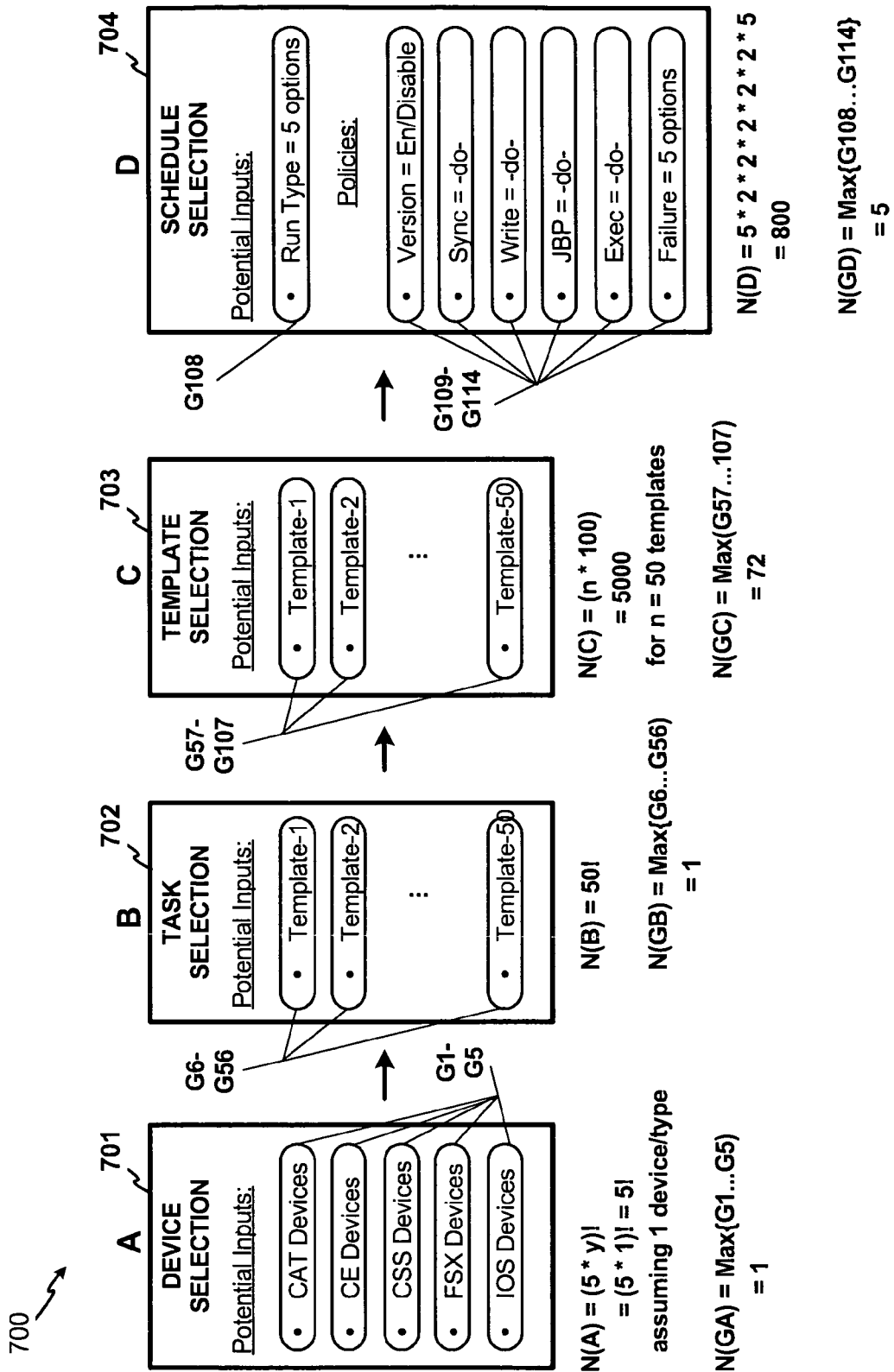
FIG. 7a illustrates examples of input set determination, feature grouping, size determination and optimal input combination set generation operations in conjunction with a target workflow, according to an embodiment of the invention.

FIG. 7a further illustrates how various system 100 embodiments may be configurable, e.g., via test parameters, for forming optimal input combination sets other than a UI page. In the present example, the target program code may include a target workflow that may, for example, include a portion of more than one UI page. Corresponding macro-level or macro testing may further include testing of the complete workflow.

Target program analyzer 122 may, for example, determine that workflow 700 comprises related network configuration workflow pages including a device selection page 701, a task selection page 702, a template selection page 703 and a schedule selection page 704, or such pages may be specified by a user as an input set or in conjunction with feature grouping, e.g., as was already discussed. Target program analyzer 122 may further determine that pages 701-704 respectively include 5 device type input controls, 1 task template input control, 1 configuration template input control and 7 schedule selection input controls. Thus, even assuming only 1 device per device type, 50 task templates, 50 configuration templates and 5 run type options, raw exhaustive input combination testing may require testing of 5!*50!*5000*800 or $10^{73}$ input combinations.

Grouping engine 123 (FIG. 4c) may provide for automatic identification of templates or wizards which, in the present example, also includes individually grouping each identified template or wizard e.g., as is shown with regard to feature groups G6 through G107 of pages B and C 702, 703. In further accordance with automatic identification of other potential groups, such as those already discussed, grouping engine 123 associates feature groups G1 through G5 and G108 through G114 with the remaining input control inputs as illustrated. The resulting feature grouping includes 5 feature groups of single input controls for page A 701, 50 feature groups of single element controls (templates) for page B 702, 50 feature groups of single input controls (templates) for page C 703, and for page D 704, 2 five input (or "option") feature groups. G108 and G114 and 5 two input feature groups G109-G113. While other feature group selections may also be used, separate grouping of page elements enables selection of all of the page elements in a single job. Thus assuming that a configuration template HTP has intermediate pages A, B, C and D, a total number of input combinations may be determined (for a macro level) as N(A)*N(B)*N(C)*N(D) equals 1*1*72*5 or 360 combinations. The total number of optimal input combinations cannot, however, be determined as Max (G1, . . . G114) since, for example, pages A, B, C and D are accessed in the sequence A→B→C→D and Groups within A and B are not mutually exclusive. (Optimal input combination selector 124 of FIG. 4d may utilize the aforementioned linked gear approach to produce an input combination set.)

Test system 100 may also be configurable, e.g., via test system parameters, for testing of bounding conditions, single values, outputs, logic, and so on, or some combination as may be desirable. As with the above examples, an input set may be limited to including only relevant targets and may, for example, include or exclude irrelevant controls or inputs in a particular instance.

Figure 7B:
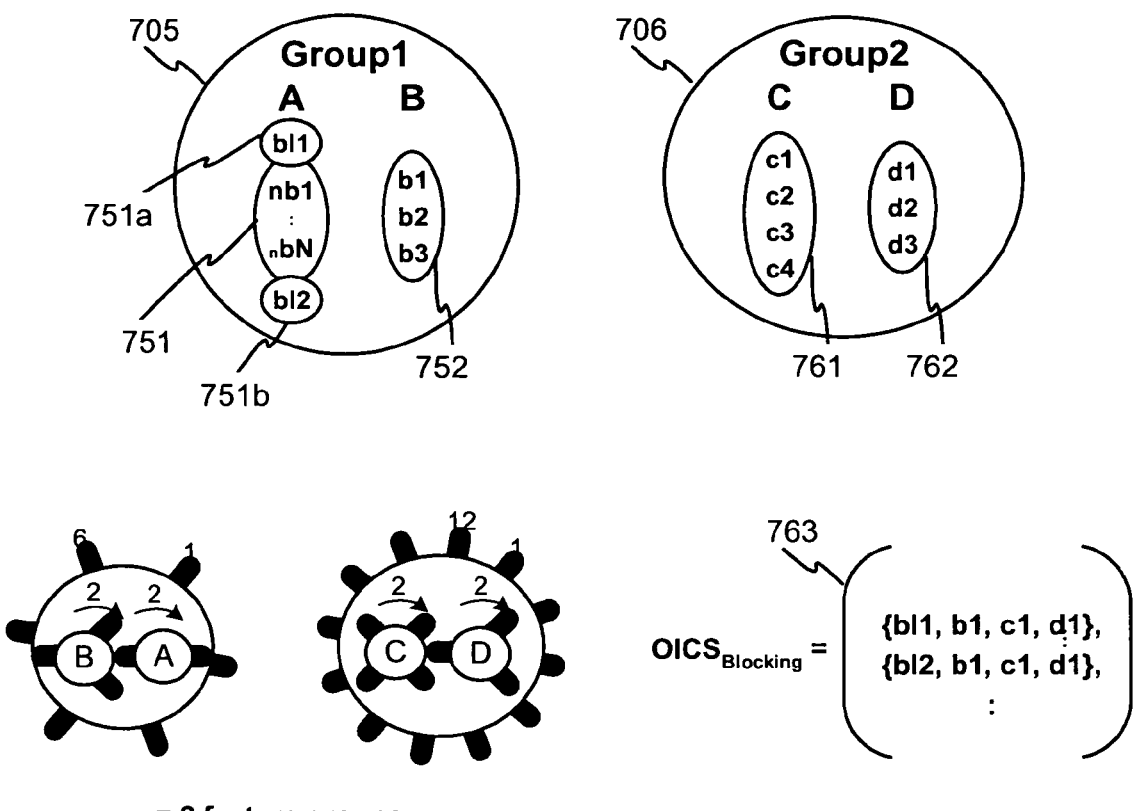
FIG. 7b illustrates application of a non-linked gear approach optimal to determining an optimal input combination set corresponding to a blocked or otherwise specified input, according to an embodiment of the invention.

For example, in instances where testing of bounding conditions, errors or other blocking inputs is desirable (FIG. 7b), target program analyzer 122 (FIG. 4b) may select an input set and grouping engine 123 (FIG. 4c) may select feature groups in much the same manner as with non-blocking inputs. That is, target program analyzer 122 may select all relevant inputs or some portion thereof in accordance with test system parameters, and grouping engine 123 may automatically or manually select feature groups or assure mutual exclusivity. Optimal input combination selector 124 (FIG. 4d), however, need not be configured for selecting a number of input combinations corresponding to a largest group and a linked gear approach need not be used. Rather, optimal input combination selection may, for example, be conducted according to an unlinked gear approach given by equations 6a and 6b. (Other mechanisms or some combination may also be used.)

Equation 6a:

$$\sum_{j=1}^{m} N_{Blocking}(Gj),$$

Equation 6b:

$$OICS_{Blocking} =$$
$$\{Exh_{Blocking}(G_{cur}) \& G2_{NonBlocking}(1) \& ...Gm_{NonBlocking}(1)\}$$

Where $curr = 1$ to $m$

In accordance with equation 6a, a number of optimal input combinations may be determined according to a summation of blocking inputs in corresponding groups. An optimal input combination may further be determined according to equation 6b that may include blocking and non-blocking inputs selected corresponding to the set of exhaustive inputs that was determined earlier. For example, in FIG. 7b, only input set A of Group1 705 includes blocking inputs; 751a, 751b. Input set B has no blocking inputs and $N_{Blocking}$ (G1) equals 2+0 or 2. Similarly, Group2 706 includes no blocking inputs for input sets C or D. Therefore, $N_{Blocking}(G2)$ equals 0+0 or 0, and $N_{Blocking}(j)=2+0$ or 2 An optimal input set, $OICS_{Blocking}$, may further be automatically selected according to equation 6b to produce OICS 763. In equation 6b, $Exh_{Blocking}(G_{cur})$ represents an exhaustive set of blocking input combinations for a current group and $Gm_{NonBlocking}(1)$ represents a first non-blocking input combination in the OICS for group Gm. (Note that since group2 has no blocking input combinations, after gear 1 has completed one full rotation, gear 2 will not gain control and will not be rotated at all. It will further be appreciated that inputs may further be selected sequentially or otherwise in accordance with test system parameters, in accordance with the requirements of a particular implementation.)

Test system 100 may also be configured for input set selection, feature grouping and optional input combination selecting, or further transfer or testing of one or more particular input values, logic, output and so on in a similar manner such as that already discussed. In conducting testing of a particular input value, for example, an exhaustive input set or relevant portion thereof may be selected and associated with feature groups. Optimal input combinations may then be selected, for example, according to a linked or unlinked gear approach in accordance with the targeted input. Using an unlinked gear approach, a typically lesser number of optimal combinations than those corresponding to a largest group (as with a linked gear approach) may be automatically selected, but using the particular unblocked input. See, for example, the below discussion regarding FIG. 7c. Using a combined approach, the particular input may also be automatically combined with a larger sampling of unblocked inputs from the remaining feature groups. It will be appreciated that a user specifiable number of optimal input combinations or test system parameters according to which test system 100 may determine a number of optimal input combinations may also be used, among other test system operation examples.

Figure 7C:
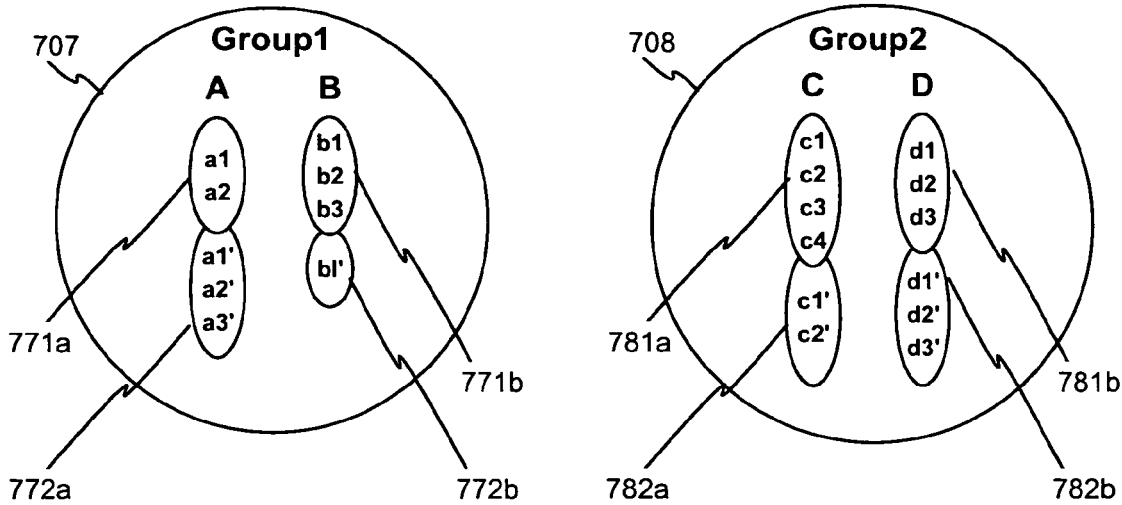
FIG. 7c illustrates a further example of determining an optimal input combination set corresponding to a blocked or otherwise specified input, according to an embodiment of the invention.

FIG. 7c further illustrates an example in which desired testing may include non-blocking and blocking inputs. As shown, group 1 707 includes, for input set A, 2 non-blocking inputs a1-a2 771a and 3 blocking inputs a1'-a3' 772a, and for input set B, 3 non-blocking inputs 771b and 1 blocking input 772b; group2 708 further includes, for input set C, 4 non-blocking (or valid) inputs c1-c4 781a and 2 blocking inputs c1'-c2' 782a, while input set D includes 3 non-blocking inputs d1-d3 781b and 3 blocking inputs d1'-d3' 782b. (It will be appreciated that a more general case of m groups including groups G1, G2 . . . . Gm may include one or more of the input sets that do not include blocking or invalid input values.)

The number of blocking input combinations for group1 or $N_{blocking}(G1)$ for the above example is 3+1 or 4, while the number of blocking input combinations for group2 or $N_{blocking}(G2)$ is 2+3 or 5. The number of optimal input combinations is given by Equation 7, wherein:

Equation 7:

$$N(OICS_{Blocking}) = \sum_{j=1}^{m} N_{Blocking}(Gj),$$

which in the present example equals $N_{Blocking}(G1)+N_{Blocking}(G2)$ or 4+5, which equals 9.

An exemplary optimal input combination set (OICS) 709c is also illustrated by FIG. 7c in which underlining further highlights a shift in control from one input set to another. By way of explanation, blocking OICS generation may include that a currently activated group should provide blocking input combinations while all other groups should provide any one non-blocking combination.

Applying the above Equation 6b, we may utilize any one non-blocking combination as a first blocking combination (for simplicity sake). A first non-blocking input combination for group1 or G1 707 is {a1, b1}, and a first non-blocking input combination for group2 or G2 708 is {c1, d1}. G1 may initially have control and may be used to generate all exhaustive blocking input combinations, while G2 may be used to provide a first non-blocking combination. Control may then transfer to G2 and the same procedure may be followed respecting G2. Exhaustive blocking input combinations 709a and 709b may therefore be produced for G1 and G2 respectively. Using a (fully) unlinked gear approach, all gears are unlinked and, within a group, a transfer of control may be shifted from one input set to another while all other input sets may proide a first non-blocking value. Workflow testing may further be determined in accordance with adding the blocking OICS and non-blocking OICS, as in Equation 8 for example, other combination, reduction, assuring mutual exclusivity, and so on, in accordance with a particular implementation.

Total Test Combinations=$N(OICS_{Blocking})+N(OICS_{Non-Blocking})$  Equation 8

The FIGS. 8 through 11b flowcharts illustrates a test optimization method that may be performed by a suitable test optimization system (test system) in conjunction with received target program code according to an embodiment of the invention. In this embodiment, an optimal input combination set may be formed to correspond with an input set and feature grouping according to fixed or parameterized single or multiple pass set generation options. The method may therefore be used to generate one or more optimal input combination sets useable for testing one or more characteristics of a given target. The testing method further provides for conducting test procedure generation or still further testing of the optimal input combination set.

Figure 8:
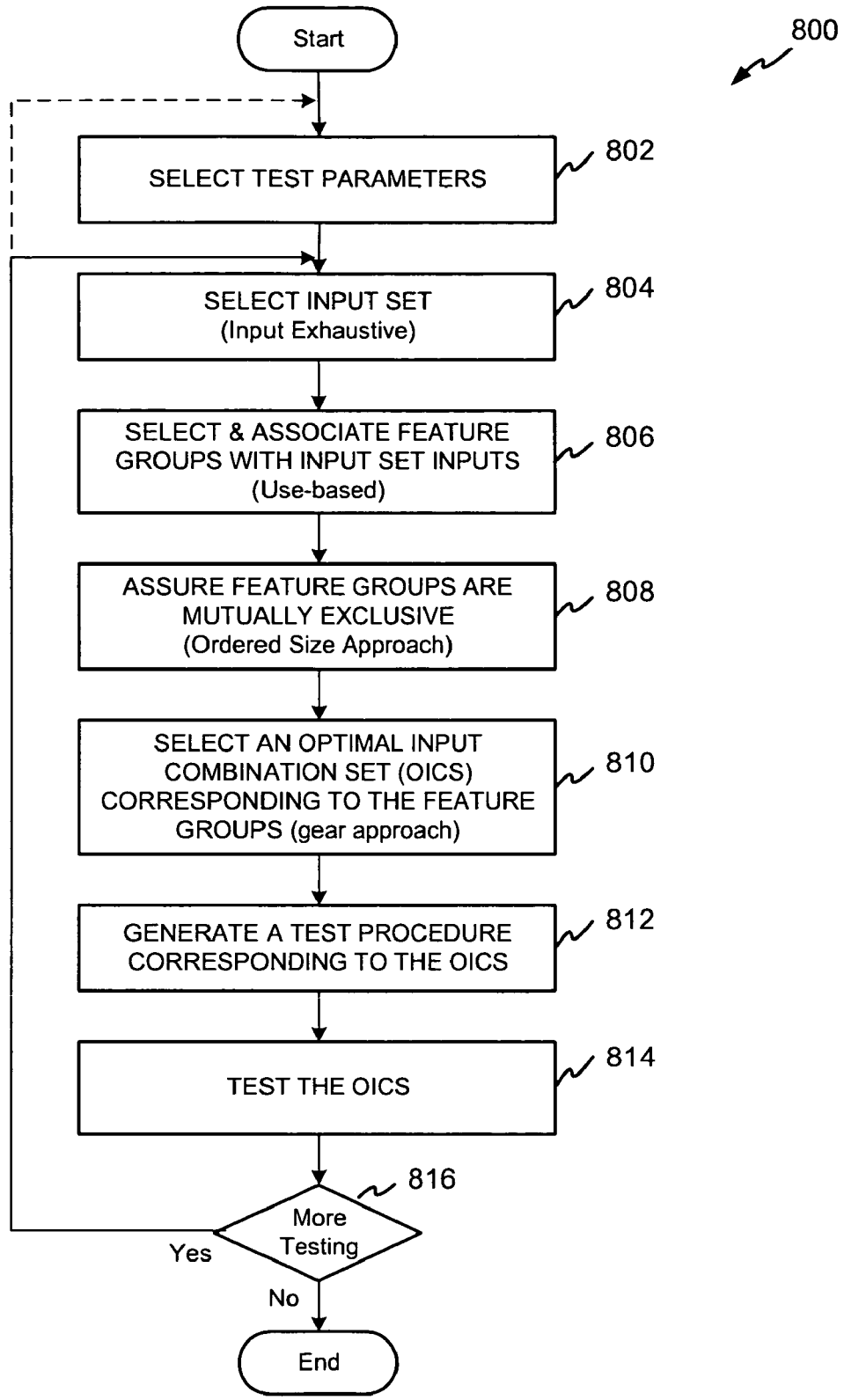
FIG. 8 is a flowchart illustrating a testing optimization method according to an embodiment of the invention.
Figure 9:
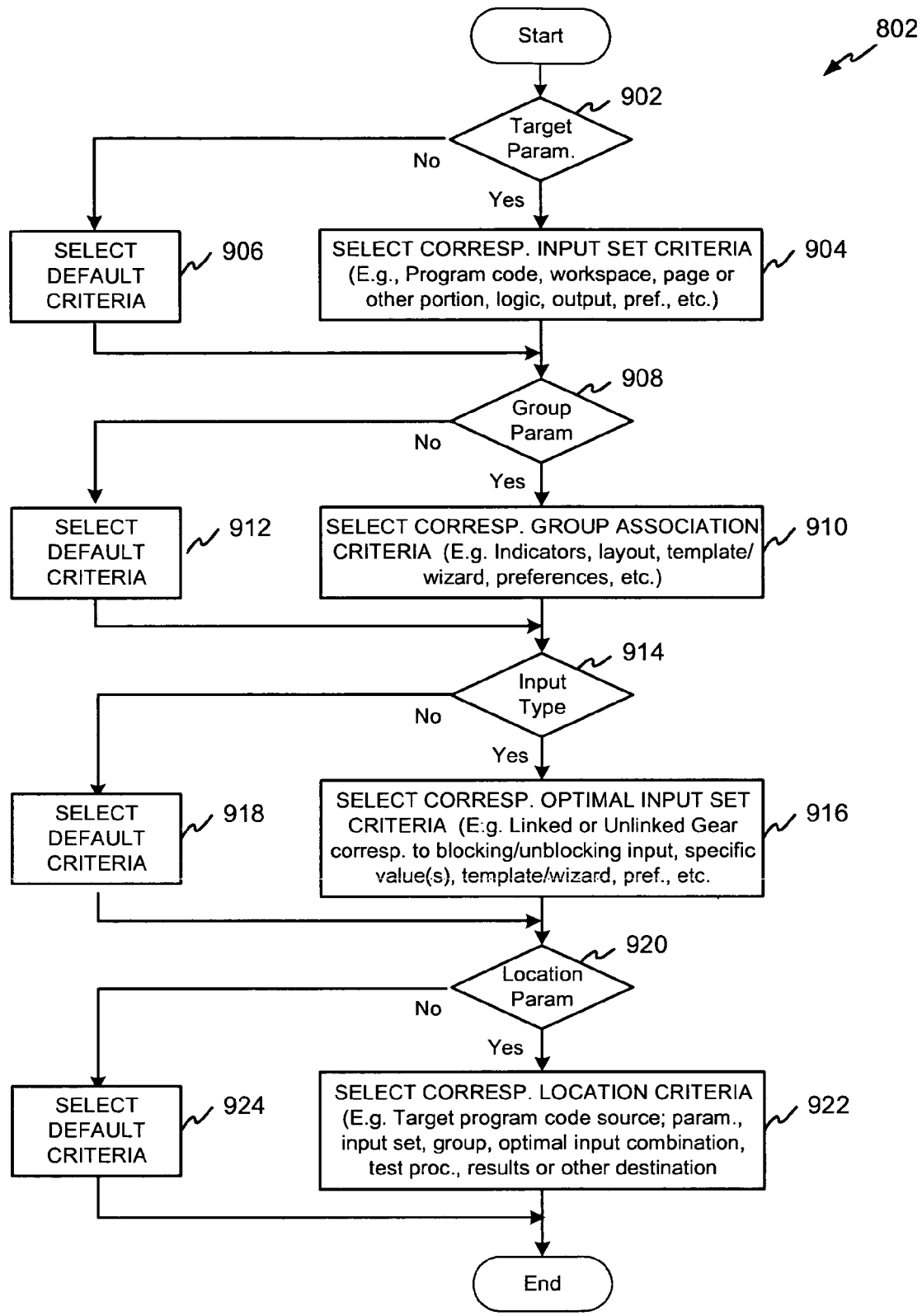
FIG. 9 is a flowchart illustrating a method for utilizing default or selectable testing parameters, according to an embodiment of the invention.

Beginning with FIG. 8, test optimization method 800 broadly includes, in block 802, a user or test system selecting of testing parameters. The testing parameters may specify test optimization method operations or provide criteria according to which test optimization method operations may be determined by a test system. Such criteria may, for example, include broad or specific target identification, processing alternatives, source/destination information (e.g., see FIG. 9) or other parameters or some combination, as may be desirable in accordance with a particular application.

Test system parameters may further be selected in accordance with single-pass or multiple-pass input combination set generation, test procedure generation, testing or information transfer. For example, parameters for single-pass testing may provide for generating and transferring a test procedure corresponding to blocking, non-blocking or other specific inputs of a particular input control, for example, as was already discussed. Contrastingly, parameters for multiple-pass testing may provide for performing a first set of steps in a first pass and then performing second or further sets of steps in one or more further passes, the same or different parameters for which may be selected together or separately. For example, first pass testing parameters may provide for generation and testing corresponding to specific inputs of a first input control in conjunction with a target program page, while second pass parameters may provide for further generation or testing corresponding to further blocking or non-blocking inputs of the same or a different input control of a workspace, among various other examples.

In block 804, the testing system selects an input set. The input set may include an input exhaustive input set or some relevant portion thereof, for example, according to predetermined or selected test optimization (or test system) parameters.

In block 806, the test system selects feature groups corresponding to the input set and associates feature groups with the input controls and corresponding inputs. The test system may select or associate the feature groups automatically or in response to user control, for example, as was already discussed. In block 808, the test system assures that the feature groups are mutually exclusive. In block 810, the test system selects optimal input combinations corresponding to the feature groups and forms an optimal input combination set. In block 812, the test system generates a test procedure corresponding to the optimal input combination set. The test procedure may, for example, include data, an automation script or other testing program code according to which testing of the optimal input combination may be conducted by the test system or some other device. In block 814, the test system tests the optimal input combination set in accordance with the test procedure generated in block 812.

Figure 10A:
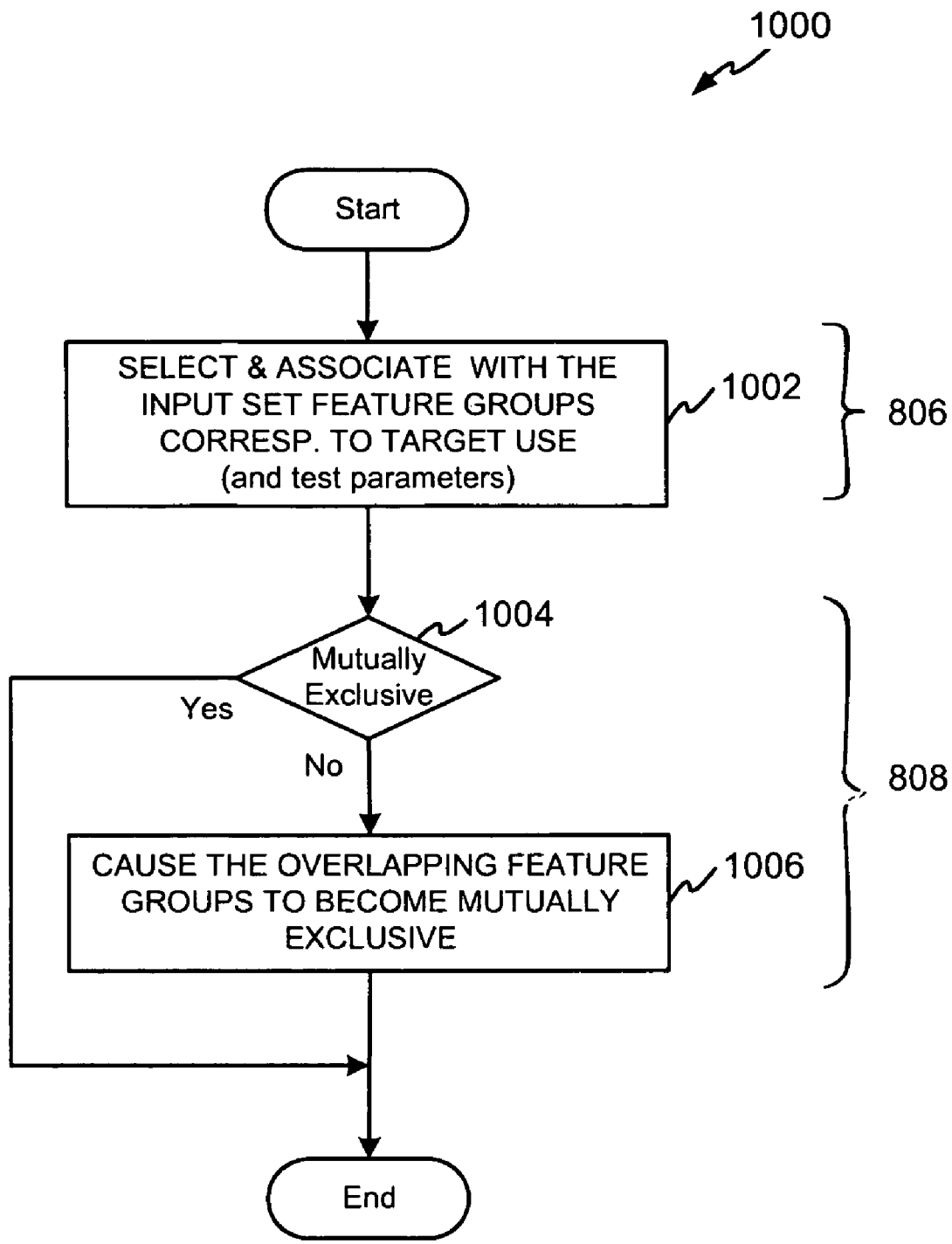
FIG. 10a is a flowchart illustrating a method for selecting and associating mutually exclusive feature groups with an input set, according to an embodiment of the invention.

The FIG. 10a flowchart illustrates examples of steps 806 and 808 of FIG. 8 in greater detail. As shown, block 806 of FIG. 8 may include the test system selecting and associating, with the input set, feature groups that correspond to a target program code macro feature or other target use (block 1002). Block 808 may further include the test system assuring mutual exclusivity by determining whether the feature groups are mutually exclusive in block 1004, and if riot (i.e., if two or more feature groups include overlapping inputs), causing the feature groups to become mutually exclusive in block 1006.

Figure 10B:
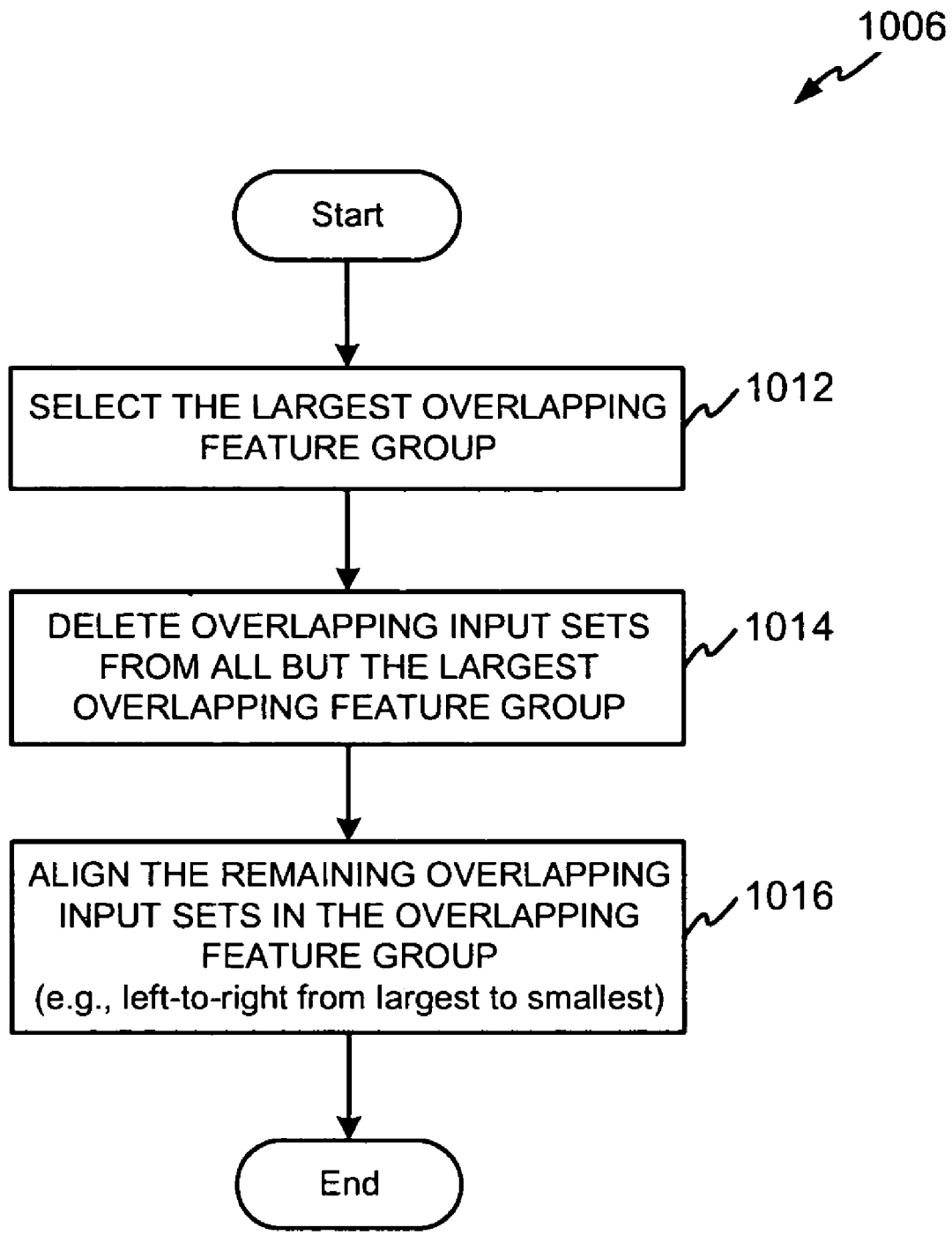
FIG. 10b is a flowchart illustrating a method for rendering overlapping feature groups mutually exclusive, according to an embodiment of the invention.

As is further shown in FIG. 10b, the test system may cause the feature groups to become mutually exclusive by performing the exemplary ordered size mutual exclusivity method of blocks 1012 through 1016. In block 1012, the test system determines a largest one of the feature groups that include overlapping inputs, i.e., the largest overlapping feature group. In block 1014, the test system deletes the overlapping inputs from all but the largest overlapping feature group. In block 1014, the testing system orders the (previously) overlapping inputs within the largest overlapping feature group. Such ordering may, for example, include ordering the input controls corresponding to the overlapping inputs, i.e., the overlapping controls, from largest to smallest input control.

Figure 11A:
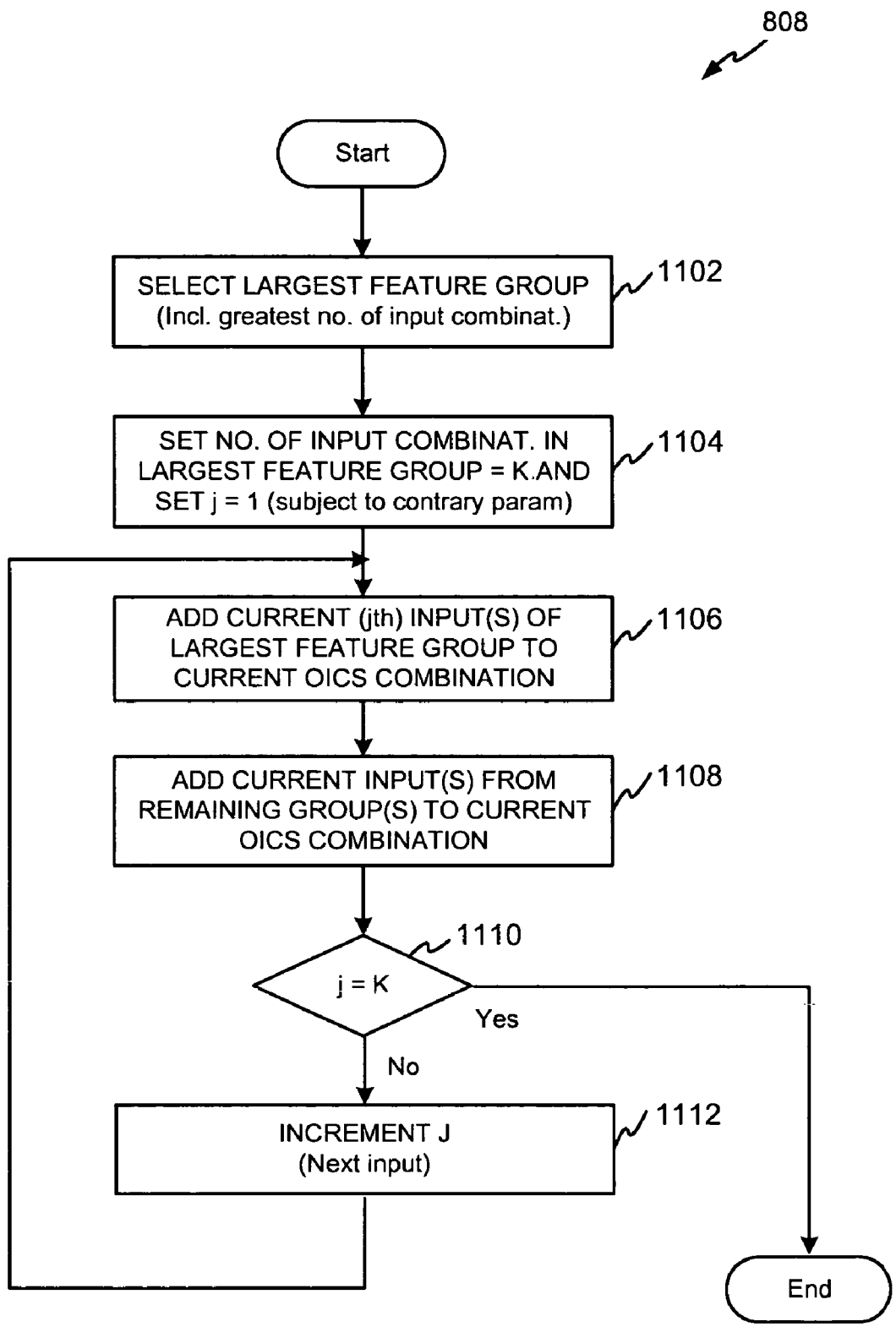
FIG. 11a is a flowchart illustrating a method for selecting an optimal input combination set corresponding to unblocked inputs, according to an embodiment of the invention.

The FIG. 11a flowchart illustrates an example of an unlinked gear approach that may be used by a test optimization system for selecting optimal input combinations corresponding to feature groups of target program code (block 810 of FIG. 8). Method 810a may, for example, be used in conjunction with conducting feature exhaustive testing of non-blocking inputs of a target program code page or workflow. In block 1102, a test system selects the largest feature group as the feature group representing the largest number of input combinations (e.g., see above).

In blocks 1104 through 1112 the test system provides for selecting a number of input combinations equal to the number of input combinations in the largest feature group and beginning with a first input of each input control in each feature group. In block 1104, the test system sets variables j and k for adding optimal input combinations to an optimal input combination set. In block 1106, the test system adds the current inputs of each input control in the largest feature group to a current input combination of an optimal input combination set. In block 1108, the test system adds the current inputs of each input control in each of the remaining feature groups to the current input combination of the optimal input combination set. If, in block 1110, the number of input combinations in the optimal input combination set is less than the number of input combinations in the largest feature group, then blocks 1106 and 1108 are repeated; otherwise the method ends.

Figure 11B:
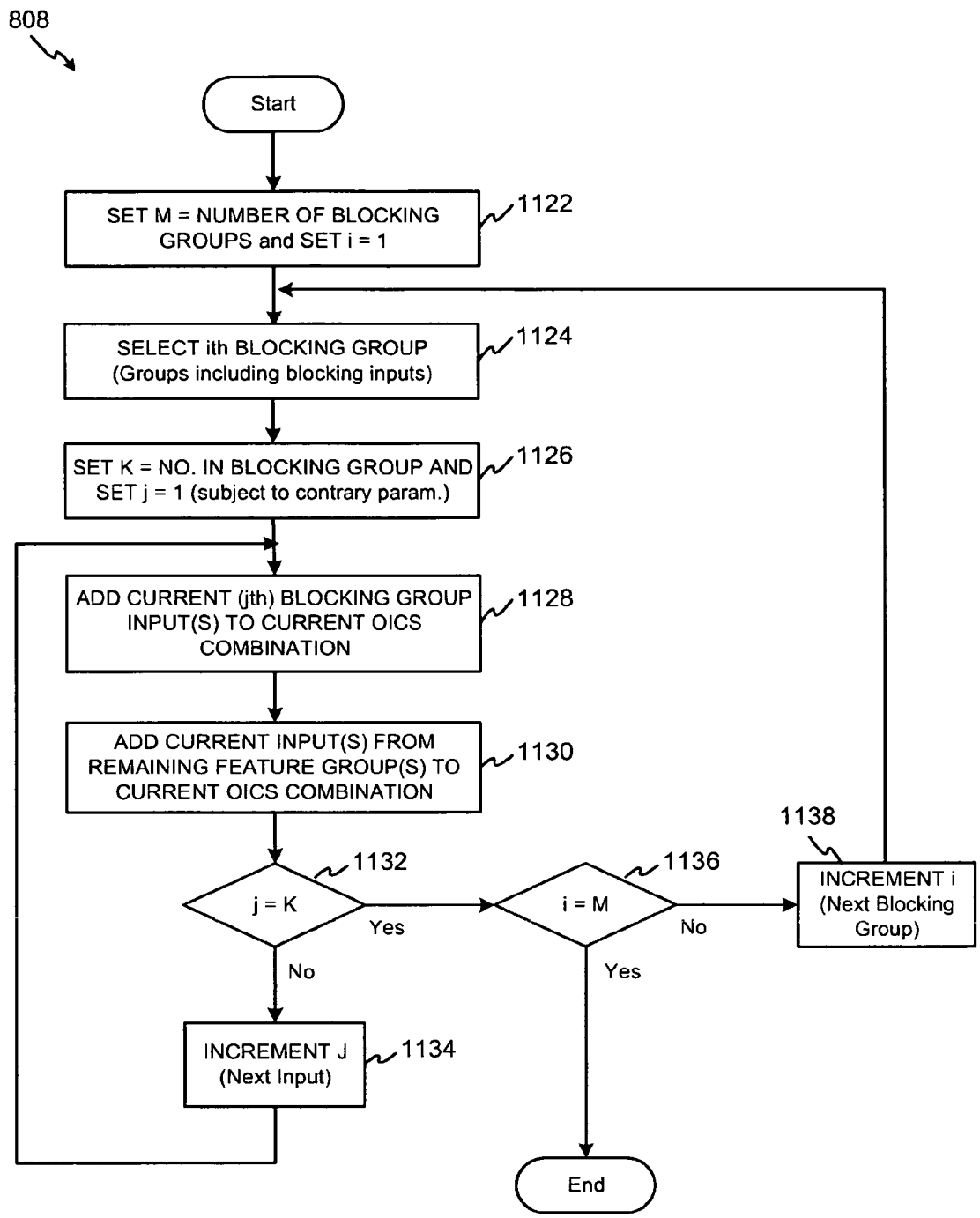
FIG. 11b is a flowchart illustrating a method for selecting an optimal input combination set including blocked or otherwise specified inputs, according to an embodiment of the invention.

The FIG. 11b flowchart illustrates an example of an unlinked gear approach that may be used for selecting optimal input combinations corresponding to feature groups of a target program (block 810 of FIG. 8). Method 810b may, for example, be used by a test system in conjunction with conducting feature exhaustive testing including blocked or other specifiable inputs of a target program code workflow, workflow page or other workflow portion.

In block 1122, variable indicators m and i are set for indicating a number of blocking groups and a current blocking group respectively. In block 1124, the test system selects a current or ith group including blocking inputs (blocking group). In block 1126, the test system sets variable indicator k to a number of inputs in a blocking group, subject to contrary test system parameters. In blocks 1128 and 1130, the test system forms an input combination set (OICS) combination by adding current (jth) blocking group inputs to the combination in block 1128 and adding current inputs from remaining feature groups to the combination in block 1130. If, in block 1132, j is not yet equal to the number of inputs in the blocking group, then j is incremented to indicate the next input and the method continues with block 1128; otherwise, indicator i is further tested against the number of blocking groups, m, in block 1136 and the method either continues by incrementing i in block 1138 or ends.

It will be appreciated that targeting of a specified input may result in selection of a single optimal input combination using an unlinked gear approach. However, a greater number of optimal input combinations may also be selectable in accordance with a linked gear approach, contrary test system parameters or some combination.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A test optimization method occurring upon execution by a processor, the method comprising:
   receiving target program code identifier parameters selected by a user for identifying target program code for a user interface (UI) to be tested, and for specifying inclusion or exclusion of at least one input from an initial representative set of inputs;
   determining the initial representative set of inputs corresponding to the target program code to obtain an input set using the target program code identifier parameters;
   selecting feature groups corresponding to the input set such that each selected feature group defines a feature of the target program code that is discernable to a user of the target program code via the UI; and
   determining a set of optimal input combinations corresponding to the selected feature groups to obtain an optimal input combination set of mutually exclusive inputs from the input set for exhaustively testing each of the selected feature groups,
   wherein obtaining the optimal input combination set of mutually exclusive inputs comprises at least one of
      a linked gear approach that utilizes a largest size feature group from the selected feature groups and at least one unique input combination in the largest size feature group, and
      an unlinked gear approach that involves blocking and non-blocking inputs selected for the exhaustive testing of the selected feature groups.

2. The method of claim 1, wherein the determining the initial representative set of inputs comprises selecting an exhaustive input set and then adjusting the exhaustive input set using the target program code identifier parameters.

3. The method of claim 1, wherein the input set corresponds to at least one page of a workflow of the target program code.

4. The method of claim 1, further comprising providing a feature group selection interface to receive a user input related to the selecting of the feature groups.

5. The method of claim 1, further comprising providing a test parameter selection interface to receive a user input for selection of a predetermined test parameter for the UI test.

6. The method of claim 1, wherein the input set includes only non-blocking inputs of at least one input control of the target program code.

7. The method of claim 1, wherein the input set includes blocking inputs of at least one input control of the target program code.

8. The method of claim 1, wherein the input set includes a representation of a hardware system portion.

9. The method of claim 1, wherein the feature groups are selected to correspond with user utilization of the target program code to be tested.

10. The method of claim 1, wherein the feature groups correspond with at least one of target program code UI wizards and target program code UI templates.

11. The method of claim 5, wherein the predetermined test parameter comprises a timing for occurrence of the UI test.

12. The method of claim 5, wherein the predetermined test parameter comprises directions for results of the UI test.

13. The method of claim 1, further comprising assuring that the feature groups are mutually exclusive.

14. The method of claim 13, wherein the assuring that the feature groups are mutually exclusive comprises:
 determining that at least two of the feature groups include overlapping inputs and are overlapping feature groups; and
 removing the overlapping inputs from all but a largest overlapping feature group.

15. The method of claim 14, further comprising ordering the overlapping inputs in the largest overlapping feature group in an order of from a largest number of inputs of a corresponding overlapping input control to a smallest number of inputs of a corresponding overlapping input control.

16. The method claim 1, wherein the determining the set of optimal input combinations corresponding to the feature groups is conducted according to a combination of both the linked gear approach and the unlinked gear approach.

17. The method of claim 1, wherein the determining the set of optimal input combinations corresponding to the feature groups is conducted according to only the unlinked gear approach.

18. The method of claim 1, further comprising determining one or more test optimization parameters, wherein for the unlinked gear approach, a number of optimal input combinations determined according the unlinked gear approach is modified according to the test optimization parameters.

19. A non-transitory computer-readable storage medium having stored thereon instructions executable by a processor for causing a test optimization system to perform the steps of:
 receiving target program code identifier parameters selected by a user for identifying target program code for a user interface (UI) to be tested, and for specifying inclusion or exclusion of at least one input from an input set;
 determining the input set corresponding to the target program code using the target program code identifier parameters;
 selecting feature groups corresponding to the input set such that each selected feature group defines a feature of the target program code that is discernable to a user of the target program code via the UI; and
 determining a set of optimal input combinations corresponding to the selected feature groups to obtain an optimal input combination set of mutually exclusive inputs from the input set for exhaustively testing each of the selected feature groups,
 wherein obtaining the optimal input combination set of mutually exclusive inputs comprises at least one of
  a linked gear approach that utilizes a largest size feature group from the selected feature groups and at least one unique input combination in the largest size feature group, and
  an unlinked gear approach that involves blocking and non-blocking inputs selected for the exhaustive testing of the selected feature groups.

20. The computer-readable storage medium of claim 19, wherein the determining the input set comprises selecting an exhaustive input set and then adjusting the exhaustive input set using the target program code identifier parameters.

21. The computer-readable storage medium claim 19, wherein the input set corresponds to at least one of a page of a workflow of the target program code and a target program workflow.

22. The computer-readable storage medium of claim 19, wherein the input set includes only non-blocking inputs of at least one input control of the target program code.

23. The computer-readable storage medium of claim 19, wherein the input set includes blocking inputs of at least one input control of the target program code.

24. The computer-readable storage medium of claim 19, wherein the feature groups are selected to correspond with user utilization of the target program code to be tested.

25. The computer-readable storage medium claim 19, wherein the test optimization system further performs providing a test parameter selection interface to receive a user input for selection of a predetermined test parameter for the UI test.

26. The computer-readable storage medium of claim 19, further comprising assuring that the feature groups are mutually exclusive.

27. The computer-readable storage medium of claim 26, wherein the assuring that the feature groups are mutually exclusive comprises:
 determining that at least two of the feature groups include overlapping inputs and are overlapping feature groups; and
 removing the overlapping inputs from all but a largest overlapping feature group.

28. The computer-readable storage medium of claim 27, further comprising ordering the overlapping inputs in the largest overlapping feature group in an order of from largest number of inputs of a corresponding overlapping input control to smallest number of inputs of a corresponding overlapping input control.

29. The computer-readable storage medium of claim 19, wherein the determining the optimal input combination set of mutually exclusive inputs corresponding to the feature groups is conducted according to a combination of both the linked gear approach and the unlinked gear approach.

30. The computer-readable storage medium claim 19, wherein the determining the optimal input combination set of mutually exclusive inputs corresponding to the feature groups is conducted according to only the unlinked gear approach.

31. The computer-readable storage medium of claim 19, test optimization system further performs determining one or more test optimization parameters, wherein for the unlinked gear approach, a number of optimal input combinations determined according the unlinked gear approach is modified according to the test optimization parameters.

32. A test optimization system, comprising:
 means for receiving target program code identifier parameters selected by a user for identifying target program code for a user interface (UI) to be tested, and for specifying inclusion or exclusion of at least one input from an initial representative set of inputs;
 means for determining the initial representative set of inputs corresponding to the target program code to obtain an input set using the target program code identifier parameters;
 means for selecting feature groups corresponding to the input set such that each selected feature group defines a feature of the target program code that is discernable to a user of the target program code via the UI; and means for determining an optimal input combination set corresponding to the selected feature groups to obtain an optimal input combination set of mutually exclusive inputs from the input set for exhaustively testing each of the selected feature groups, wherein obtaining the optimal input combination set of mutually exclusive inputs comprises at least one of a linked gear approach that utilizes a largest size feature group from the selected feature groups and at least one unique input combination in the largest size feature group, and an unlinked gear approach that involves blocking and non-blocking inputs selected for the exhaustive testing of the selected feature groups.

* * * * *

UNITED STATES PATENT AND TRADEMARK OFFICE
CERTIFICATE OF CORRECTION

| | |
|---|---|
| PATENT NO. | : 7,979,845 B2 |
| APPLICATION NO. | : 11/138805 |
| DATED | : July 12, 2011 |
| INVENTOR(S) | : Marimuthu |

Page 1 of 1

It is certified that error appears in the above-identified patent and that said Letters Patent is hereby corrected as shown below:

On the Title Page, Item [75] should read:

Inventor: Venkadesan Marimuthu, Chennai (IN)

On the Title Page:

The first or sole Notice should read --

Subject to any disclaimer, the term of this patent is extended or adjusted under 35 U.S.C. 154(b) by 1322 days.

Signed and Sealed this
Thirteenth Day of August, 2013

Teresa Stanek Rea
*Acting Director of the United States Patent and Trademark Office*